US009955373B2

(12) United States Patent
Siomina et al.

(10) Patent No.: US 9,955,373 B2
(45) Date of Patent: Apr. 24, 2018

(54) SYSTEMS AND METHODS FOR CONTROLLING LOGGING AND REPORTING UNDER CONSTRAINTS

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 69 days.

(21) Appl. No.: 14/070,755

(22) Filed: Nov. 4, 2013

(65) Prior Publication Data

US 2014/0128057 A1 May 8, 2014

Related U.S. Application Data

(60) Provisional application No. 61/722,628, filed on Nov. 5, 2012.

(51) Int. Cl.
*H04W 24/10* (2009.01)
*H04J 3/06* (2006.01)
(Continued)

(52) U.S. Cl.
CPC .......... *H04W 24/10* (2013.01); *H04J 3/0685* (2013.01); *H04W 24/02* (2013.01); *H04W 52/0287* (2013.01); *H04W 56/00* (2013.01)

(58) Field of Classification Search
None
See application file for complete search history.

(56) References Cited

U.S. PATENT DOCUMENTS 6,292,748 B1    9/2001   Harrison
6,600,919 B1    7/2003   Kawase
(Continued)

FOREIGN PATENT DOCUMENTS

CA    2669041 A1    12/2010
WO    2012047070 A2    4/2012
WO    2012060765 A1    5/2012

OTHER PUBLICATIONS

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.1.0, 3GPP Organizational Partners, Sep. 2012, 325 pages.
(Continued)

*Primary Examiner* — Kimberly A Williams
(74) *Attorney, Agent, or Firm* — Withrow & Terranova, PLLC

(57) ABSTRACT

Systems and methods are disclosed herein for controlling reporting and/or logging of data by a wireless device in a cellular communications network under one or more constraints. In one embodiment, a node in the cellular communications network makes a determination as to whether at least one of logged data logged by a wireless device in a log, data associated with the logged data, data to be logged by the wireless device, and data associated with the data to be logged by the wireless device satisfies one or more constraints. The node then controls at least one of reporting of the log by the wireless device and logging of data in the log by the wireless device in response to the determination.

8 Claims, 16 Drawing Sheets

(51) Int. Cl.
    *H04W 24/02*     (2009.01)
    *H04W 52/02*     (2009.01)
    *H04W 56/00*     (2009.01)

(56) References Cited

U.S. PATENT DOCUMENTS

| | | |
|---|---|---|
| 2003/0016770 A1 | 1/2003 | Trans et al. |
| 2005/0289453 A1 | 12/2005 | Segal et al. |
| 2006/0279628 A1 | 12/2006 | Fleming |
| 2010/0188255 A1 | 7/2010 | Cornwall |
| 2010/0331013 A1 | 12/2010 | Zhang |
| 2011/0194441 A1* | 8/2011 | Jung et al. ............... 370/252 |
| 2011/0269402 A1 | 11/2011 | Yi et al. |
| 2011/0287793 A1* | 11/2011 | Tenny et al. ............... 455/507 |
| 2012/0040621 A1 | 2/2012 | Jung et al. |
| 2012/0092998 A1* | 4/2012 | Chang ............... H04W 24/10 370/241 |
| 2012/0106356 A1 | 5/2012 | Johansson et al. |
| 2012/0113837 A1 | 5/2012 | Siomina et al. |
| 2012/0282916 A1* | 11/2012 | Futaki et al. ............ 455/422.1 |
| 2012/0311136 A1 | 12/2012 | Shafi et al. |
| 2013/0005356 A1* | 1/2013 | Kobayashi ............. 455/456.1 |
| 2013/0109320 A1* | 5/2013 | Tomala et al. ........... 455/67.11 |
| 2013/0121204 A1* | 5/2013 | Lee ............... H04W 24/10 370/252 |
| 2013/0130627 A1* | 5/2013 | Fukuta ............... H04W 24/10 455/67.11 |
| 2013/0137379 A1* | 5/2013 | Jung ............... H04W 24/00 455/67.11 |
| 2013/0208610 A1* | 8/2013 | Mach ............... H04W 24/10 370/252 |
| 2013/0272139 A1* | 10/2013 | Guo et al. ............... 370/242 |
| 2013/0326224 A1 | 12/2013 | Yavuz |
| 2014/0051428 A1* | 2/2014 | Jung et al. ............ 455/422.1 |
| 2014/0126472 A1 | 5/2014 | Siomina et al. |
| 2014/0213194 A1* | 7/2014 | Feng ............... H04W 24/10 455/67.11 |
| 2014/0295847 A1* | 10/2014 | Futaki ............... 455/436 |
| 2015/0023180 A1* | 1/2015 | Feng ............... H04W 24/08 370/241.1 |
| 2015/0341784 A1* | 11/2015 | Wang ............... H04W 24/10 455/423 |

OTHER PUBLICATIONS

Author Unknown, "Technical Specification Group Radio Access Network; Evolved Universal Terrestrial Radio Access (E-UTRA); Requirements for support of radio resource management (Release 10)," Technical Specification 36.133, Version 10.8.1, 3GPP Organizational Partners, Sep. 2012, 667 pages.

Author Unknown, "Technical Specification Group Radio Access Network; Evolved Universal Terrestrial Radio Access (E-UTRA); Requirements for support of radio resource management (Release 11)," Technical Specification 36.133, Version 11.2.0, 3GPP Organizational Partners, Sep. 2012, 672 pages.

Author Unknown, "Technical Specification Group Radio Access Network; Requirements for support of radio resource management (FDD) (Release 11)," Technical Specification 25.133, Version 11.2.0, 3GPP Organizational Partners, Sep. 2012, 277 pages.

Author Unknown, "Technical Specification Group Radio Access Network; Requirements for support of radio resource management (TDD) (Release 11)," Technical Specification 25.123, Version 11.0.0, 3GPP Organizational Partners, Jun. 2012, 453 pages.

Author Unknown, "Technical Specification Group Services and System Aspects; Telecommunication management; Subscriber and equipment trace; Trace concepts and requirements (Release 11)," Technical Specification 32.421, Version 11.4.0, 3GPP Organizational Partners, Sep. 2012, 37 pages.

Author Unknown, "Technical Specification Group Services and System Aspects; Telecommunication management; Subscriber and equipment trace; Trace control and configuration management (Release 11)," Technical Specification 32.422, Version 11.5.0, 3GPP Organizational Partners, Sep. 2012, 124 pages.

Author Unknown, "Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)," Technical Specification 37.320, Version 1.0.0, 3GPP Organizational Partners, Aug. 2010, 14 pages.

Ericsson, St-Ericsson, "R4-126679: On MDT requirements in Rel-11," 3rd Generation Partnership Project (3GPP), TSG-RAN WG4 Meeting #65, Nov. 12-16, 2012, 3 pages, New Orleans, Louisiana.

Griffith, Danielle et al., "A 65nm CMOS DCXO System for Generating 38.4MHz and a Real Time Clock from a Single Crystal in 0.09 mm2," 2010 IEEE Radio Frequency Integrated Circuits Symposium, May 23-25, 2010, Anaheim, California, pp. 321-324.

Huawei, Hisilicon, "R4-112059: Further discussion on relative time stamp accuracy for MDT," 3rd Generation Partnership Project (3GPP), TSG-RAN WG4 Meeting #58AH, Apr. 11-15, 2011, 2 pages, Shanghai, China.

Miyayama, T. et al., "A New Digitally Temperature Compensated Crystal Oscillator for a Mobile Telephone System," Proceedings of the 42nd Annual Frequency Control Symposium, Jun. 1-3, 1988, Baltimore, Maryland, pp. 327-333.

Schmid, Thomas et al., "Exploiting Manufacturing Variations for Compensating Environment-induced Clock Drift in Time Synchronization," Proceedings of the 2008 ACM SIGMETRICS International Conference on Measurement and Modeling of Computer Systems, vol. 36, No. 1, Jun. 2-6, 2008, Annapolis, Maryland, 12 pages.

NTT Docomo, "R4-110616: Clarifications of time stamp accuracy for MDT," 3rd Generation Partnership Project (3GPP), TSG-RAN WG4 meeting #58, Feb. 21-25, 2011, 3 pages, Taipei, Taiwan.

International Search Report and Written Opinion for PCT/IB2013/059911 dated Jan. 28, 2014, 13 pages.

International Search Report and Written Opinion for PCT/IB2013/059917 dated Feb. 25, 2014, 13 pages.

Author Unknown, "Technical Specification Group Core Network and Terminals; Non-Access-Stratum (NAS) protocol for Evolved Packet System (EPS); Stage 3 (Release 11)," Technical Specification 24.301, Version 11.4.0, 3GPP Organizational Partners, Sep. 2012, 341 pages.

Author Unknown, "Technical Specification Group Radio Access Network; Radio Resource Control (RRC); Protocol specification (Release 11)," Technical Specification 25.331, Version 11.3.0, 3GPP Organizational Partners, Sep. 2012, 1981 pages.

Author Unknown, "Technical Specification Group Radio Access Network; Study on Minimization of drive-tests in Next Generation Networks (Release 9)," Technical Report 36.805, Version 9.0.0, 3GPP Organizational Partners, Dec. 2009, 24 pages.

Author Unknown, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall Description; Stage 2 (Release 11)," Technical Specification 37.320, Version 11.1.0, 3GPP Organizational Partners, Sep. 2012, 21 pages.

Non-Final Office Action for U.S. Appl. No. 14/070,758, dated Aug. 18, 2015, 30 pages.

Non-Final Office Action for U.S. Appl. No. 14/070,758, dated Mar. 15, 2016, 34 pages.

Final Office Action for U.S. Appl. No. 14/070,758, dated Sep. 22, 2016, 33 pages.

Notice of Preliminary Rejection for Korean Patent Application No. 10-2015-7014722, dated May 23, 2016, 13 pages.

Office Action for Mexican Patent Application No. MX/A/2015/005613, dated Apr. 20, 2016, 4 pages.

Office Action for Mexican Patent Application No. MX/a/2015/005613, dated Aug. 9, 2016, 6 pages.

Mah, Matthew et al., "Time-based Location Techniques Using Inexpensive, Unsynchronized Clocks in 802.11 Wireless Cards: PinPoint Location System," Mar. 25, 2010, University of Maryland, College Park, 42 pages.

(56) References Cited

OTHER PUBLICATIONS

Advisory Action for U.S. Appl. No. 14/070,758, dated Nov. 23, 2016, 9 pages.

* cited by examiner

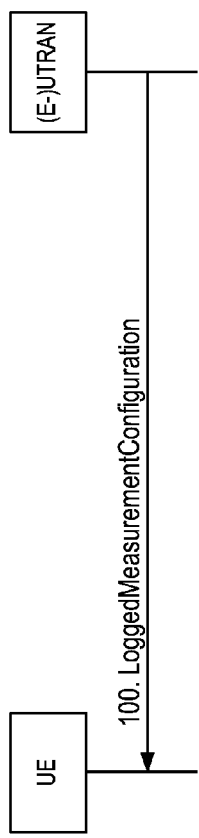

FIG. 1

```
LoggedMeasurementConfiguration-r10-IEs ::= SEQUENCE {
    traceReference-r10            TraceReference-r10,
    traceRecordingSessionRef-r10  OCTET STRING (SIZE (2)),
    tce-Id-r10                    OCTET STRING (SIZE (1)),
    absoluteTimeInfo-r10,
    areaConfiguration-r10         AreaConfiguration-r10           OPTIONAL, --Need OR
    loggingDuration-r10           LoggingDuration-r10,
    loggingInterval-r10           LoggingInterval-r10,
    nonCriticalExtension          LoggedMeasurementConfiguration-v11x0-IEs   OPTIONAL
}

LoggedMeasurementConfiguration-v11x0-IEs ::= SEQUENCE {
    lateNonCriticalExtension      OCTET STRING                    OPTIONAL,   --Need OP
    plmn-IdentityList3-r11        PLMN-IdentityList-r11           OPTIONAL,   --Need OP
    areaConfiguration-v11x0       AreaConfiguration-v11x0         OPTIONAL,   --Need OR
    nonCriticalExtension          SEQUENCE {}                     OPTIONAL    --Need OP
}
```

FIG. 2

– VarConnEstFail-Report
The UE variable VarConnEstFail-Report includes the connection establishment failure information.

VarConnEstFail-Report UE variable

-- ASN1START

```
VarConnEstFail-Report-r11 ::=        SEQUENCE {
    connEstFailReport-r11                ConnEstFailReport-r11,
    plmn-Identity-r11                    PLMN-Identity
}

--ASN1STOP

ConnEstFailReport-r11 ::=            SEQUENCE {
    failedCellId-r11                     CellGlobalIdEUTRA,
    locationInfo-r11                     LocationInfo-r10                     OPTIONAL,
    measResultFailedCell-r11             SEQUENCE {
        rsrpResult-r11                       RSRP-Range,
        rsrqResult-r11                       RSRQ-Range
    },
    measResultNeighCells-r11             SEQUENCE {
        measResultListEUTRA-r11              MeasResultList2EUTRA-r9              OPTIONAL,
        measResultListUTRA-r11               MeasResultList2UTRA-r9               OPTIONAL,
        measResultListGERAN-r11              MeasResultListGERAN                  OPTIONAL,
        measResultsCDMA2000-r11              MeasResultList2CDMA2000-r9           OPTIONAL
    }                                                                        OPTIONAL,
    numberOfPreamblesSent-r11            INTEGER (1..200),
    contentionDetected-r11               BOOLEAN,
    maxTxPowerReached-r11                BOOLEAN,
    timeSinceFailure-r11                 INTEGER (0..172800)                  OPTIONAL,
    ...
}
```

FIG. 5

SYSTEMS AND METHODS FOR CONTROLLING LOGGING AND REPORTING UNDER CONSTRAINTS

RELATED APPLICATIONS

This application claims the benefit of provisional patent application Ser. No. 61/722,628, filed Nov. 5, 2012, the disclosure of which is hereby incorporated herein by reference in its entirety.

This application is related to U.S. patent application Ser. No. 14/070,758, entitled SYSTEMS AND METHODS FOR MAINTAINING TIME STAMPING ACCURACY TO MEET A NON-LINEAR TIME DRIFT CONSTRAINT, filed Nov. 4, 2013, now U.S. Pat. No. 9,674,723, which is commonly owned and assigned and is hereby incorporated herein by reference in its entirety.

FIELD OF THE DISCLOSURE

The present disclosure relates to logging and reporting data in a wireless communications network and, more specifically, to controlling logging and reporting of data in a wireless communications network under various constraints.

BACKGROUND

Non-real time measurements and background services are becoming more and more common in cellular communications networks. More and more information is being exchanged between the cellular communications network and wireless devices in the cellular communications network for various purposes, e.g., file sharing, measurements reporting for Minimization of Drive Tests (MDT), etc. Deploying radio nodes that provide a specific service or a restricted set of services becomes more justified in such wireless network architectures. Third Generation Partnership Project (3GPP) standards, however, provide limited possibilities for using such specialized service nodes, and in particular provide limited possibilities for specialized service nodes facilitating non-real time information collection throughout the cellular communications network. To enable full functionality, such specialized service nodes would have to, at a minimum, announce their presence and availability and, in one way or another, indicate the service(s) being provided by the specialized service node.

One example application of collecting non-real time measurements is MDT and enhanced MDT, which is being standardized for Universal Mobile Telecommunications System (UMTS) and Long Term Evolution (LTE). MDT is used as a means to compensate or partially replace costly drive tests an operator will otherwise have to perform by configuring a selection of User Equipment devices (UEs) in active or idle mode to do certain types of measurements, as specified in 3GPP Technical Report (TR) 36.805 ("Evolved Universal Terrestrial Radio Access (E-UTRA); Study on minimization of drive-tests in next generation networks") and 3GPP TR 37.320 ("Radio measurement collection for Minimization of Drive Tests (MDT)"). The selection can be made based on International Mobile Subscriber Identity (IMSI), International Mobile Equipment Identity (IMEI), area, device capabilities, and any combinations thereof.

So far, the following use cases for MDT have been identified:

Coverage optimization,
Mobility optimization,
Capacity optimization,
Parameterization for common channels, and
Quality of Service (QoS) verification.

Two modes of MDT exist, immediate MDT and logged MDT. Immediate MDT is the MDT functionality involving measurement performance by a UE in a high Radio Resource Control (RRC) activity state (e.g., RRC CONNECTED state in LTE, CELL_DCH state in Universal Terrestrial Radio Access (UTRA) Frequency Division Duplexing (FDD) and UTRA Time Division Duplexing (TDD), etc.) and reporting of the measurements to a network node (e.g., an Evolved Node B (eNB), a Radio Network Controller (RNC), a Node B (NB), a Base Station Controller (BSC), a Base Station (BS), a relay, etc.) available at the time of the occurrence of a reporting condition. Logged MDT is the MDT functionality involving measurement performance by a UE when operating in a low RRC activity state (e.g., RRC_IDLE in LTE and idle mode, CELL_PCH, URA_PCH or CELL_FACH states in UTRA FDD or UTRA TDD, etc.). The logging in a low activity state is carried out by the UE at points when configured conditions are satisfied. The measurement log is stored for reporting of measurements to a network node (e.g., eNB, Radio Network Controller (RNC) Node B (NB), BSC, BS, relay, etc.) at a later point in time.

One possible requirement for MDT in particular implementations is that the measurements in measurement logs and the reported measurements for immediate MDT are linked to available location information and/or other information or measurements that can be used to derive location information (e.g., Reference Signal Received Power (RSRP) measurements may be selected for this purpose in some implementations). The measurements in the measurement logs are also linked to a time stamp that is available in the UE.

In various implementations, the following measurements logs (or suitable alternatives) may be utilized:

Periodical downlink pilot measurements,
Serving cell becomes worse than threshold,
Transmit power headroom becomes less than threshold,
Random access failure,
Paging channel failure,
Broadcast channel failure, and
Radio link failure report.

In addition to the information which may be specific for the type of the log, all of the measurement logs listed above include at least the following:

Location information when available (e.g., the location at which the concerned trigger and/or measurement took place),
Time information (e.g., the time at which the concerned trigger and/or measurement took place),
Cell identification (at least the serving cell is always included), and
Radio environment measurement (e.g., cell measurements that are available at the trigger for the logged measurement and/or average cell measurements during a certain period before/after the trigger for the logged measurement, where the cell measurements include RSRP and Reference Signal Received Quality (RSRQ) measurements).

Signaling of MDT measurements and logs, including the associated location information, is via RRC signaling. For logged MDT, the configuration, measurement collection, and reporting of the concerned measurements will always be done in cells of the same Radio Access Technology (RAT) type. There is only one RAT-specific logged measurement configuration for logged MDT in the UE, and it is left up to the cellular communications network to retrieve any relevant data before providing a new configuration (e.g. for another RAT) since the previous log may be cleared.

When a logging area is configured, logged MDT measurements are performed as long as the UE is within this logging area. When the UE is not in the logging area or a Registered Public Land Mobile Network (PLMN) (RPLMN) of the UE is not part of an MDT PLMN list, logging is suspended, i.e. the logged measurement configuration and the log are kept (until a logging duration timer expires), but measurement results are not logged and the logging duration timer continues. In case a new PLMN that does not belong to the MDT PLMN list provides a logged measurement configuration, any previous logged measurement configuration and the corresponding log are cleared and overwritten without being retrieved by the cellular communications network.

Logged MDT measurements are configured with an MDT Measurement Configuration procedure, which is illustrated in FIG. 1. As shown, the cellular communications network, specifically the Radio Access Network (RAN) (i.e., the Universal Terrestrial Radio Access Network (UTRAN) or Evolved Universal Terrestrial Radio Access Network (E-UTRAN)), initiates the procedure to a UE in RRC Connected state by sending a LoggedMeasurementConfiguration message to the UE (step 100). The LoggedMeasurementConfiguration message is sent in the Downlink (DL) Dedicated Control Channel (DCCH) Message class, which is a set of RRC messages that may be sent from the E-UTRAN to the UE or from the E-UTRAN to the relay node on the DL DCCH logical channel. The LoggedMeasurementConfiguration message is used to transfer configuration parameters for logged MDT. A release operation for logged measurement configuration in the UE is realized only by replacing the logged measurement configuration with a new configuration (i.e., when the logged measurement configuration is overwritten) or by clearing the logged measurement configuration when a duration timer has expired or an expiration condition is met. The format of the LoggedMeasurementConfiguration message is illustrated in FIG. 2.

At the UE, upon receiving the LoggedMeasurementConfiguration message, the UE starts a timer T330 with the timer value set to a LoggingDuration specified in the LoggedMeasurementConfiguration message. Upon expiry of the timer T330 or when memory reserved for the logged measurement information becomes full (which triggers T330 expiry), the UE is allowed to discard VarLogMeasConfig. VarLogMeasConfig is defined in 3GPP Technical Specification (TS) 36.331 as the UE variable that includes the configuration of the logging of measurements to be performed by the UE while in RRC_IDLE, covering intra-frequency, inter-frequency, and inter-RAT mobility related measurements. The variable VarLogMeasConfig is signaled to the UE by the network node in an RRC message. Forty-eight (48) hours after expiry of the timer T330, the UE is also allowed to discard the stored logged measurements and VarLogMeasReport. VarLogMeasReport is also defined in 3GPP TS 36.331 as the UE variable that includes the logged measurements information. The UE variable VarLogMeasReport is also signaled to the UE by the network node in an RRC message.

Within the LoggedMeasurementConfiguration message, LoggingDuration defines an amount of time that measurements are to be logged after the UE receives the LoggedMeasurementConfiguration message. LoggingDuration is one of the predefined values in the range of 10 minutes to 120 minutes. LoggingInterval is an interval of measurement logging and is one of the predefined values in the range of 1.28 seconds to 2.56 seconds. The Trace Collection Entity (TCE) Identifier (ID), tce-Id, denotes a particular TCE. The UE returns the tce-Id to the cellular communications network together with the logged data. The cellular communications network has a configured mapping of an Internet Protocol (IP) address of the TCE (to which corresponding trace records are transferred) and the TCE ID. The mapping needs to be unique within the PLMN.

If areaConfiguration is configured, the UE will log measurements as long as the UE is within the configured logging area. The scope of the logging area may consist of one of a list of 32 global cell identities. If this list is configured, the UE will only log measurements when camping in any of these cells. Alternatively, the logging area may consist of a list of eight Tracking Areas (TAs), eight Local Areas (LAs), or eight Registered Areas (RAs). If this list is configured, the UE will only log measurements when camping in any cell belonging to the preconfigured TA/LA/RAs. If no logging area is configured, the logged measurement configuration is valid in the entire MDT PLMN of the UE, i.e. the UE will log measurements throughout the MDT PLMN.

FIG. 3 illustrates an example of logged MDT reporting as described in 3GPP TS 32.421, "Telecommunication management; Subscriber and equipment trace; Trace concepts and requirements," V11.4.0, September 2012 and 3GPP TS 32.422, "Telecommunication management; Subscriber and equipment trace; Trace control and configuration management," V11.5.0, September 2012, both of which are incorporated herein by reference herein their entireties. In case of logged MDT, the UE collects the measurements while it is in IDLE mode. As illustrated, MDT is configured as discussed above (step 200). The UE enters the IDLE mode (step 202). While in the IDLE mode, the UE performs MDT measurement logging (step 204). Sometime after measurement logging is complete (i.e., after the logging duration has expired), the UE enters the RRC CONNECTED mode (step 206), and the UE indicates MDT log availability in an RRCConnectionSetupComplete message sent to the RNC/eNB (step 208). The UE will not indicate MDT log availability in another RAT or in another RPLMN.

When the RNC/eNB receives the indication of the MDT log availability, the RNC/eNB can request the MDT log (if the UE is still in the same RAT type where the MDT configuration was done) by sending a UEInformationRequest message to the UE (step 210). The MDT log is then sent to the RNC/eNB in a UEInformationResponse message (step 212). The reporting may occur in different cells than which the logged measurement configuration is signaled. At the reception of the UEInformationResponse message, the RNC/eNB saves the received MDT log to a trace record (step 214) and sends the trace record to the corresponding TCE (step 216).

The reported MDT log consists of measurement results for the serving cell of the UE (the measurement quantity), available UE measurements performed in IDLE mode for intra-frequency/inter-frequency/inter-RAT, time stamps, and location information. The number of neighboring cells to be logged is limited by a fixed upper limit per frequency for each category (e.g., six for intra-frequency neighboring cells, three for inter-frequency neighboring cells, etc.). The measurement reports for neighboring cells (which are part of the same MDT log/report as the measurements for the serving cell but contained in different Information Elements (IEs)) consist of: Physical Cell Identity (PCI) of the logged cell, carrier frequency, RSRP and RSRQ for E-UTRA, Received Signal Code Power (RSCP) and Energy per Chip (Ec)/Noise Spectral Density (No) for UTRA, Primary Common Control Physical Channel (P-CCPCH) RSCP for UTRA 1.28 TDD, Received Signal Level (Rxlev) for Global System for Mobile Communications Edge Radio Access Network (GERAN), and Pilot Pseudo noise (Pn) Phase and Pilot Strength for Code Division Multiple Access (CDMA) 2000.

In case of immediate MDT, as illustrated in FIG. 4, the MDT is first configured as discussed above (step 300). For immediate MDT, the UE is in RRC CONNECTED mode. The UE periodically logs MDT measurements and reports the logged MDT measurements to the RNC/eNB via RRC signaling (as part of existing RRC measurements) where the logged MDT measurements are stored to a trace record (steps 302 through 312). The immediate MDT measurement reports are periodic (with intervals in the range of 120 milliseconds (ms) to 1 hour) or event-triggered. The trace records are sent to the TCE via an Element Manager (EM), where the EM can reside in the RNC/eNB (steps 314 and 316).

In addition to MDT logs, the UE logs failed RRC connection establishments for LTE and UMTS, i.e. a log is created when the RRC connection establishment procedure fails. For LTE, the trigger for creating a log related to a failed RRC connection establishment is when timer T300 expires. For UMTS, the trigger for creating a log related to a failed RRC connection establishment is when V300 is greater than N300. Unlike logged MDT and immediate MDT, the UE logs failed RRC connection establishments without the need for prior configuration by the cellular communications network.

For an RRC connection establishment failure log, the UE stores the selected PLMN on the RRC connection establishment failure. The UE may report the RRC connection establishment failure log only if that PLMN is the same as the RPLMN. The RRC connection establishment failure log includes:
  Time stamp, which is the elapsed time between logging and reporting the log,
  The global cell identity of the serving cell when the RRC connection establishment fails, i.e. the cell which the UE attempted to access,
  The latest available radio measurements for any frequency or RAT,
  The latest detailed location information, if available,
  For LTE:
    Number of random access preambles transmitted,
    Indication whether the maximum transmission power was used, and
    Contention detected,
  For UMTS FDD:
    Number of RRC Connection Request attempts (e.g., T300 expiry after receiving an Acknowledgement (ACK) and an Acquisition Indicator Channel (AICH)),
    Indication of probable contention, e.g. mismatch of UE identity in RRC CONNECTION SETUP message, and
  For UMTS TDD:
    Number of RRC connection request attempts,
    Indication of probable contention, e.g. mismatch of UE identity in RRC CONNECTION SETUP message,
    Whether the Fast Physical Access Channel (FPACH) is received or whether the maximum number Mmax of synchronization attempts is reached, and
    Failure indication of the Enhanced Dedicated Channel Random Access Uplink Control Channel (E-RUCCH) transmission. The failure indication is only applied if common Enhanced Dedicated Channel (E-DCH) is supported by the UE and the cellular communications network.

With regard to RRC connection establishment failure logging in LTE, the content of the report is illustrated in FIG. 5. The information for the RRC connection establishment failure log is logged at expiry of timer T300, which is initiated when the UE sends an RRCConnectionRequest. The timer T300 is stopped when the UE receives an RRCConnectionSetup or RRCConnectionReject message, when there is cell re-selection, or upon abortion of connection establishment by upper layers. The timer T300 is defined in 3GPP TS 36.331 as follows:

| Timer | Start | Stop | At expiry |
| --- | --- | --- | --- |
| T300 | Transmission of RRCConnectionRequest | Reception of RRCConnectionSetup or RRCConnectionReject message, cell re-selection, and upon abortion of connection establishment by upper layers | Perform the actions as specified in 5.3.3.6 |

The availability of the RRC connection establishment failure report (the connEstFailInfoAvailable indication) may be indicated upon reception by the UE of the following messages:
  RRCConnectionSetup,
  RRCConnectionReconfiguration including the mobilityControlInfo (handover), and
  RRCConnectionReestablishment.

The time stamping for the RRC connection establishment failure report is upon receiving a UEInformationRequest message when the report is available. The UEInformationRequest message may be sent to the UE when the availability of the report (by the indicator connEstFailInfoAvailable) has been indicated by the UE. The UE then includes the available report in a UEInformationResponse message. Specifically, upon receiving the UEInformationRequest message, the UE will:
  If connEstFail-ReportReq is set to true and the UE has connection establishment failure information in VarConnEstFail-Report and if the RPLMN is equal to plmn-Identity stored in VarConnEstFail-Report:
    Set timeSinceFailure in VarConnEstFail-Report to the time that elapsed since the last connection establishment failure; and
    Set the connEstFail-Report in the UEInformationResponse message to the value of connEstFail-Report in VarConnEstFail-Report.

In UTRA, the logging of an RRC connection establishment failure depends on timer V300. Namely, when V300 is greater than N300, the UE performs the following actions for logging of a failed RRC connection establishment (as specified in 3GPP TS 25.311, section 8.1.3.11):
  If the RRC connection establishment fails, the UE shall perform logging of information for later retrieval. The UE shall store connection establishment failure information in the variable LOGGED_CONNECTION_ESTABLISHMENT_FAILURE by setting its respective fields to corresponding values.

From the above, it becomes evident that there is a substantial difference between time stamping for RRC connection establishment failure log reporting and time stamping for MDT measurement logs in RRC IDLE mode. This difference is schematically illustrated in FIG. 6. As shown, the major difference is that the time stamp for the RRC connection establishment failure log my occur after up to 48 hours after a reference time (failure logged), while the maximum time for maximum time for the logged MDT measurements to be logged and time-stamped is two hours with respect to a reference time (MDT configuration received).

Current MDT logging and reporting mechanisms as well as current RRC connection establishment failure logging and reporting mechanisms have a number of problems. As such, there is a need for systems and methods for enhanced MDT logging and/or reporting as well as enhanced RRC connection establishment failure logging and/or reporting.

SUMMARY

Systems and methods are disclosed herein for controlling reporting and/or logging of data by a wireless device in a cellular communications network under one or more constraints. In one embodiment, a node in the cellular communications network makes a determination as to whether at least one of logged data logged by a wireless device in a log, data associated with the logged data, data to be logged by the wireless device, and data associated with the data to be logged by the wireless device satisfies one or more constraints. The node then controls at least one of reporting of the log by the wireless device and logging of data in the log by the wireless device in response to the determination. In one embodiment, the log is a Minimization of Drive Tests (MDT) log. In another embodiment, log is at least one of a radio measurement log, a Radio Resource Control (RRC) connection establishment failure log, a random access failure log, a paging channel failure log, a broadcast channel failure log, and a radio link failure log. In one embodiment, the node is a network node. In another embodiment, the node is the wireless device.

In one embodiment, the one or more constraints include a timing constraint. In another embodiment, the one or more constraints include a quality constraint. In another embodiment, the one or more constraints include a probability of loss constraint. In another embodiment, the one or more constraints include a reliability constraint. In yet another embodiment, the one or more constraints include a resource constraint.

In one embodiment, the node controls reporting of the log by the wireless device. In one particular embodiment, the node controls reporting of the log to proactively report the log prior to a pre-configured time at which the log was to be reported in response to making the determination that the one or more constraints are satisfied. In another embodiment, the node controls reporting of the log by initiating reporting of the log prior to a pre-configured time at which the log was to be reported in response to making the determination that the one or more constraints are satisfied. In another embodiment, the node controls reporting of the log to delay reporting of the log. In another embodiment, the node controls reporting of the log to suspend reporting of the log.

In one embodiment, the node controls logging of data in the log by the wireless device. In one embodiment, the node controls logging of data by suspending the logging of data in the log. In another embodiment, the node controls logging of data by performing an action that leads to erasing the log at the wireless device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a conventional Minimization of Drive Tests (MDT) configuration procedure;

FIG. 2 illustrates the format of a conventional Logged-MeasurementConfiguration message used for MDT configuration;

FIG. 5 illustrates the content of a Radio Resource Control (RRC) connection establishment failure log as defined in 3GPP standards;

Figure 3:
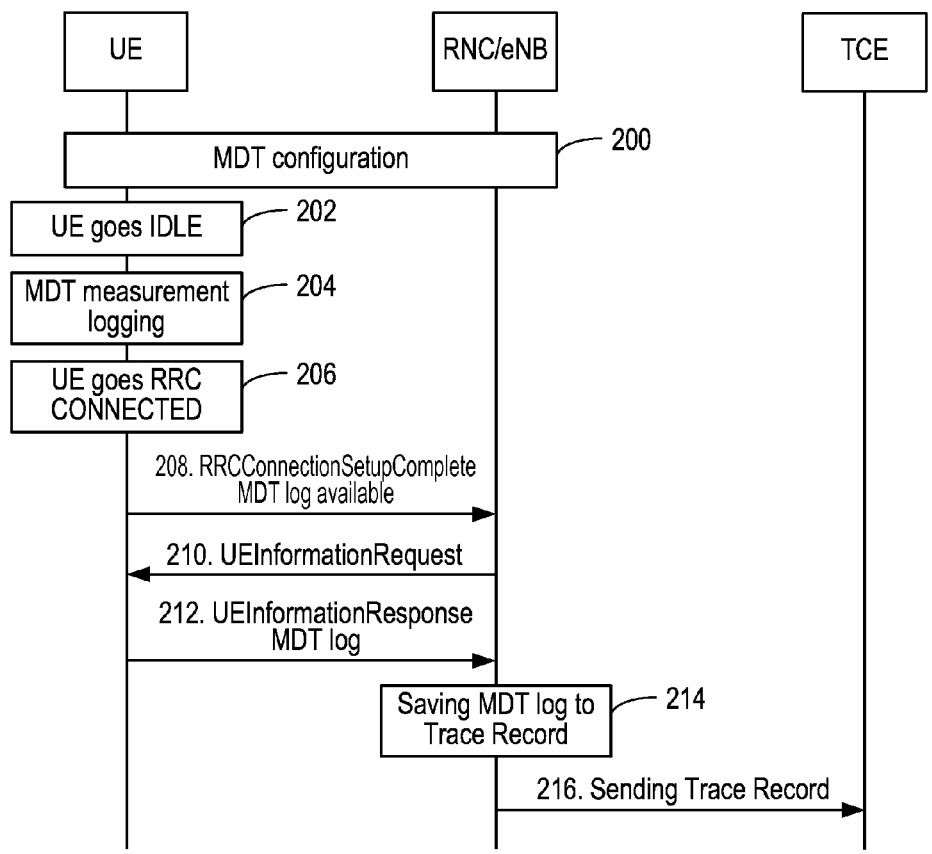
FIG. 3 illustrates an example of Logged MDT reporting as described in $3^{rd}$ Generation Partnership Project (3GPP) standards.
Figure 4:
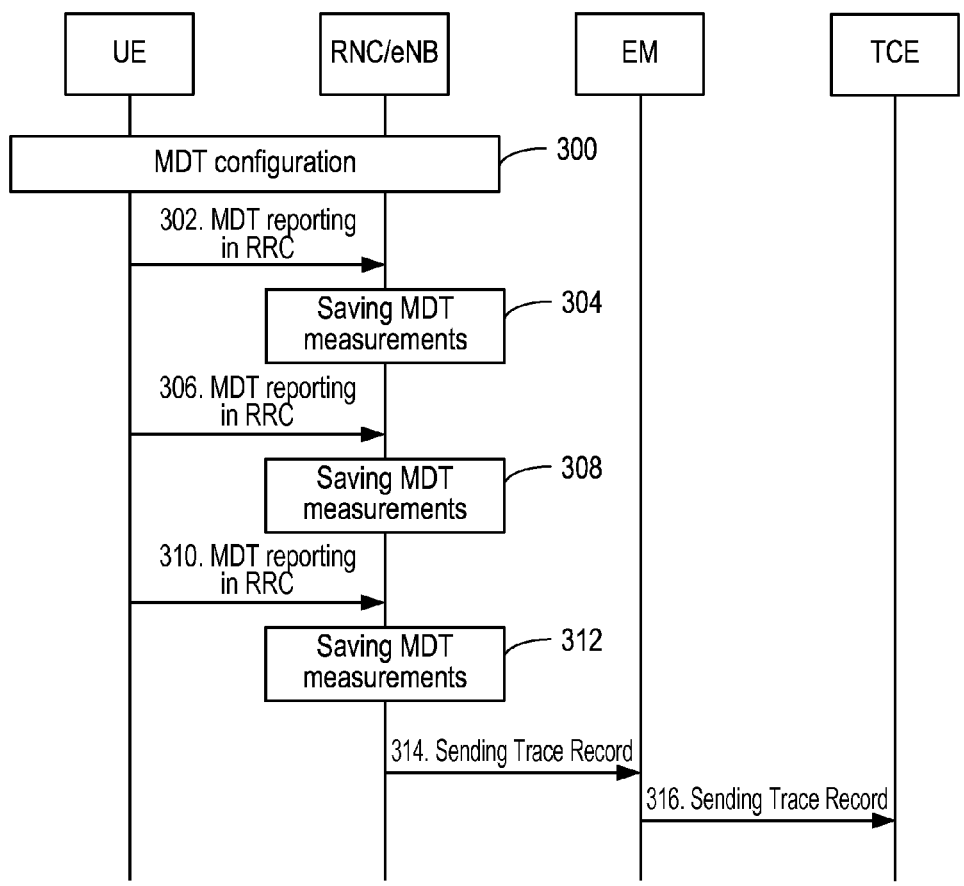
FIG. 4 illustrates an example of immediate MDT reporting.
Figure 6:
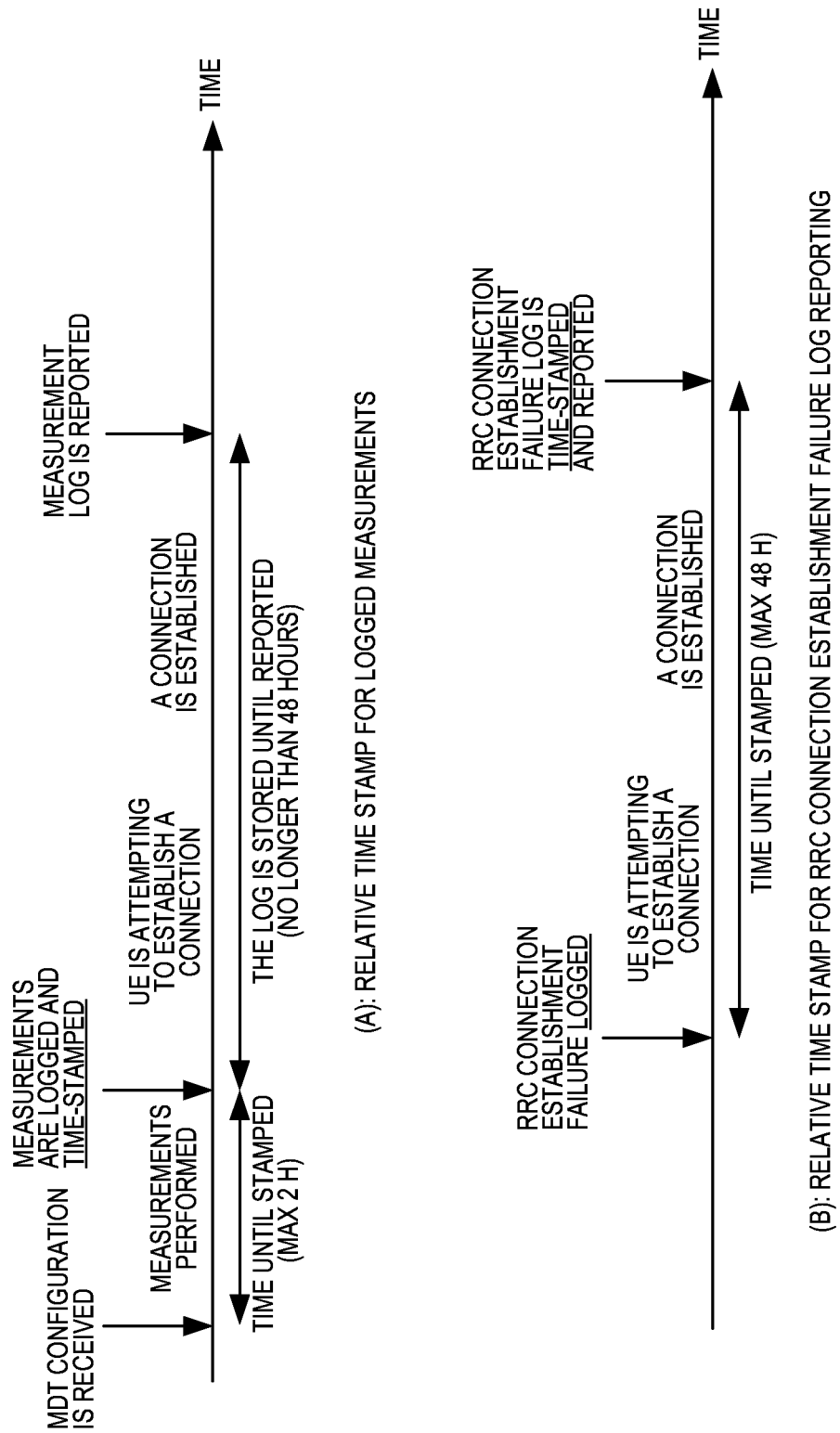
Figure 7:
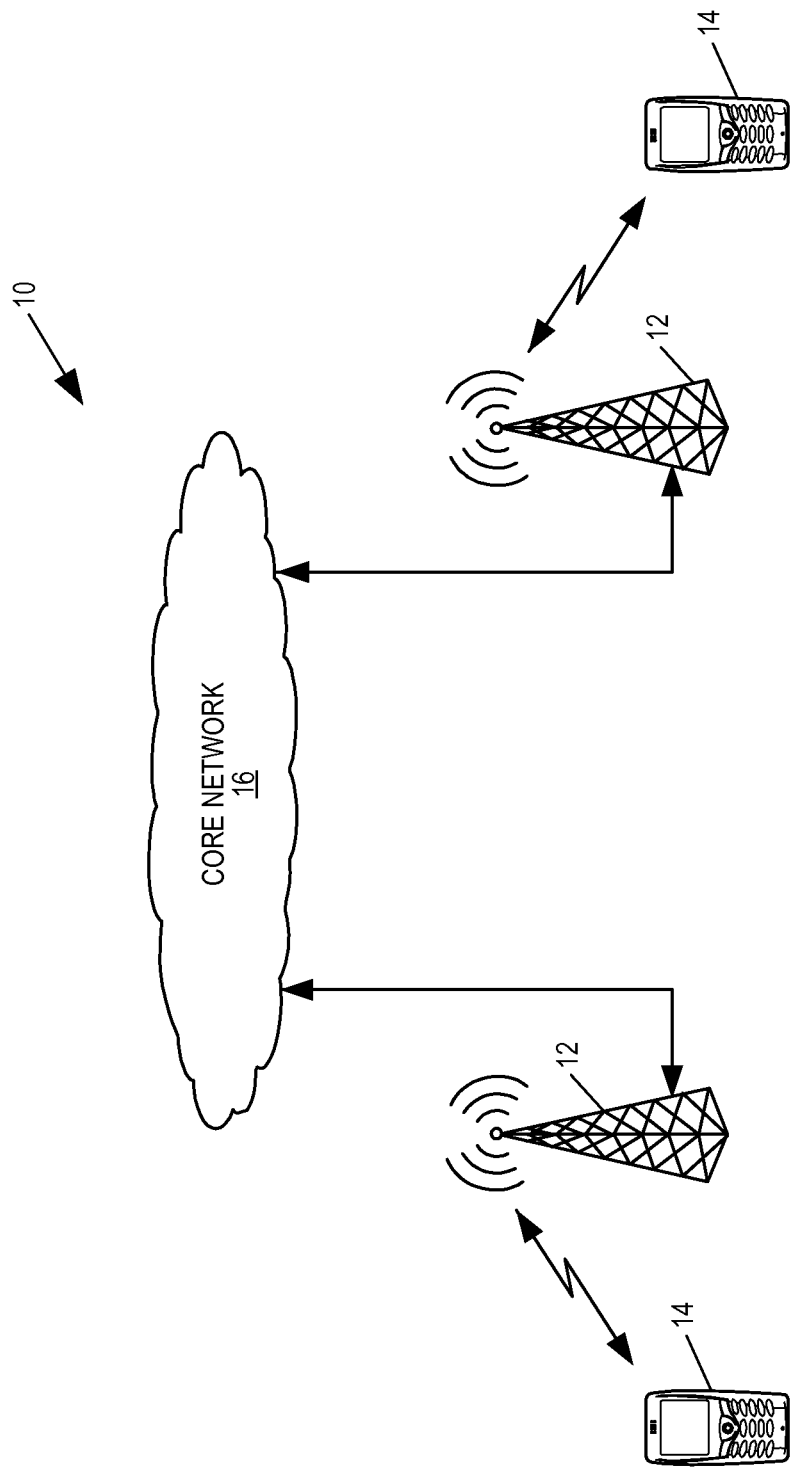
Figure 8:
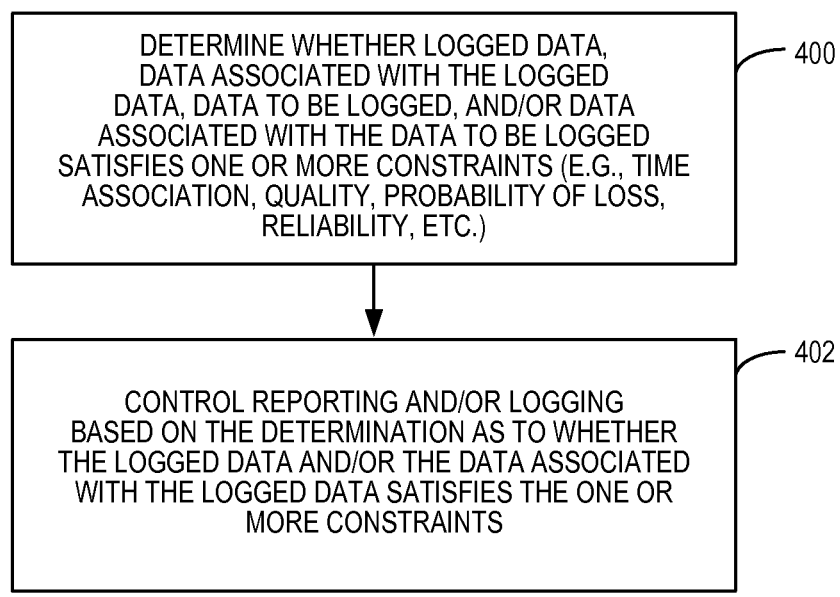
Figure 9:
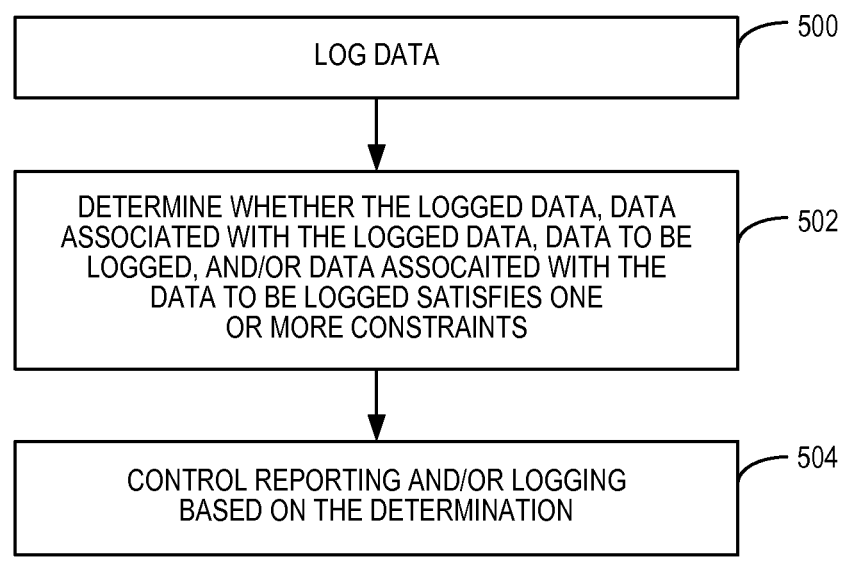
Figure 10:
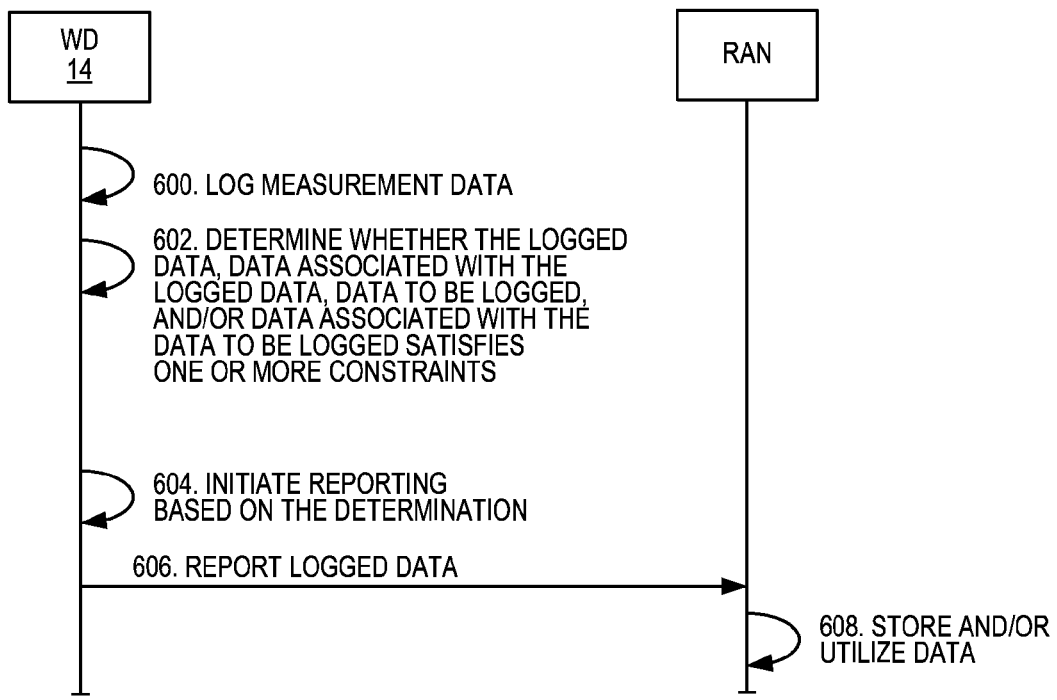
Figure 11:
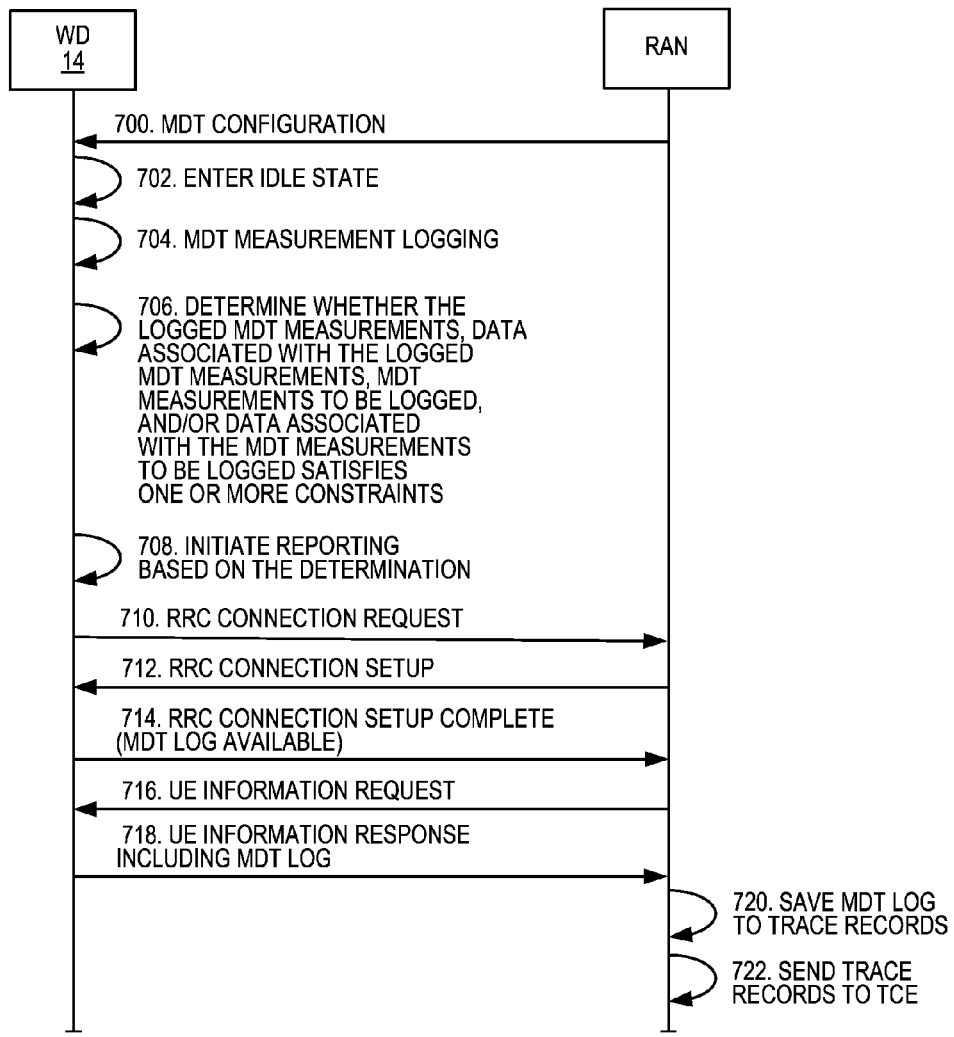
Figure 12:
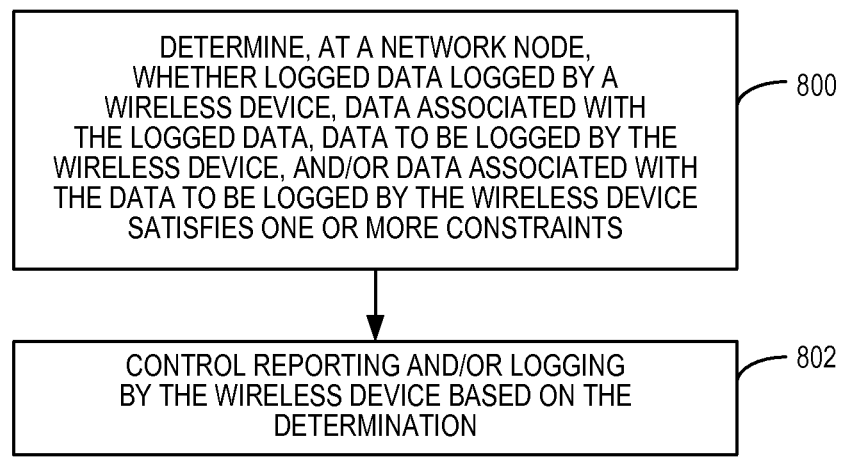
Figure 13:
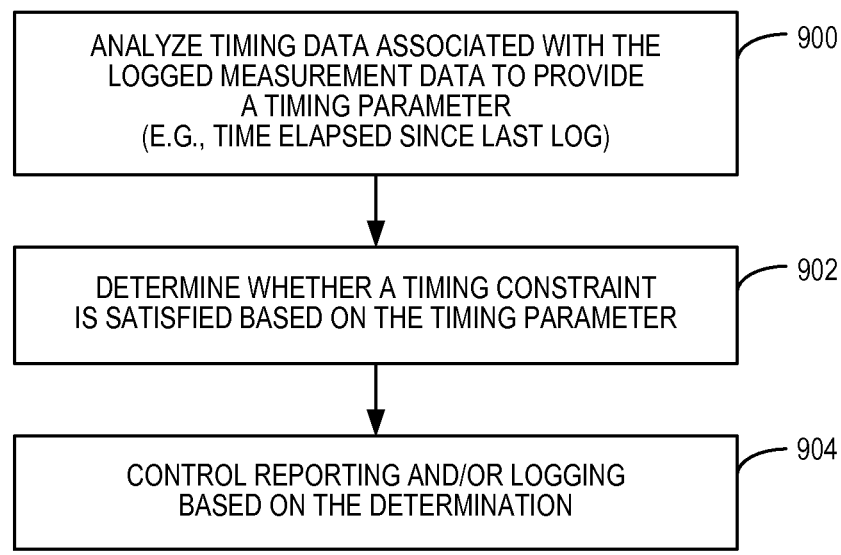
Figure 14:
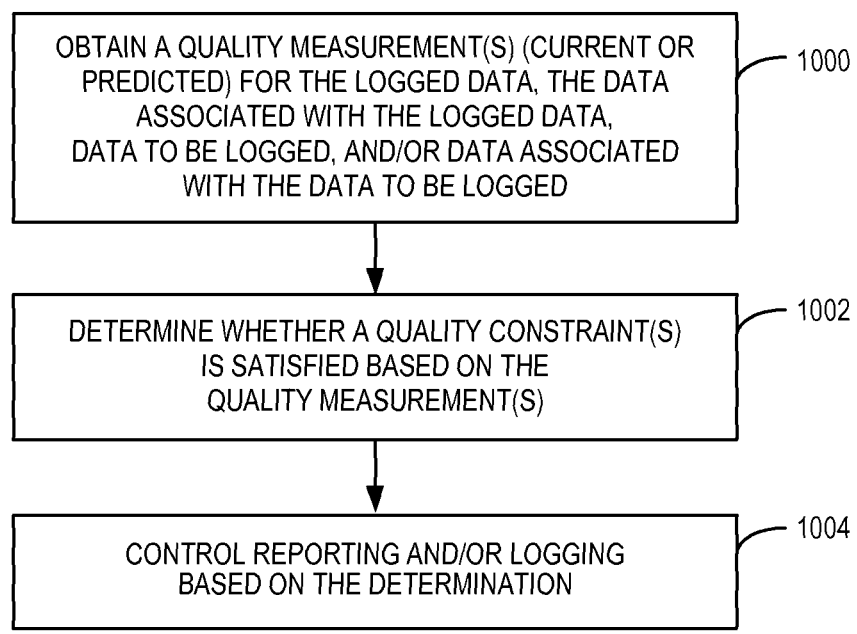
Figure 15:
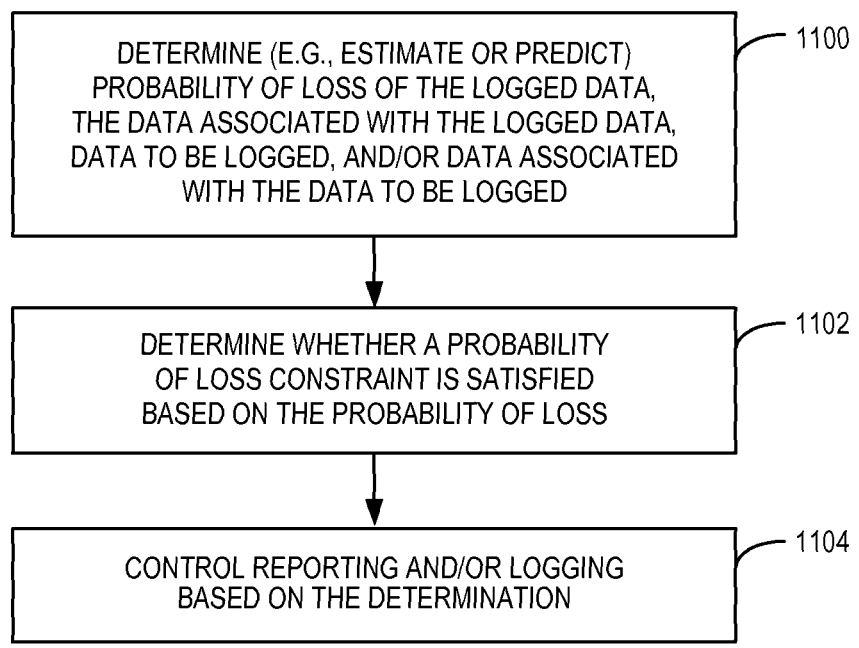
Figure 16:
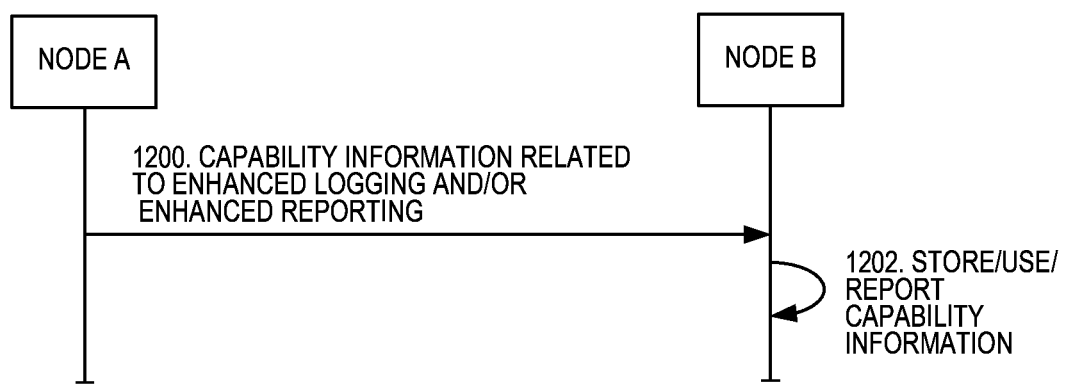
Figure 17:
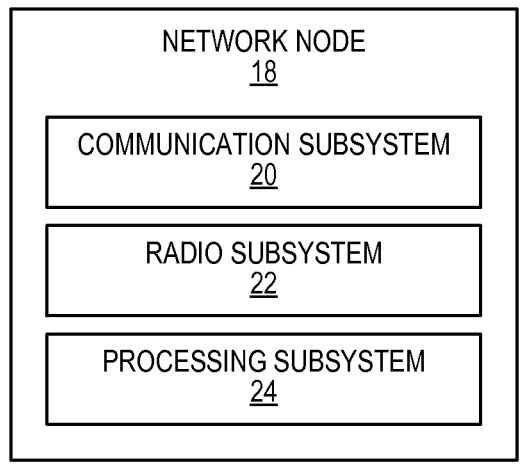
Figure 18:
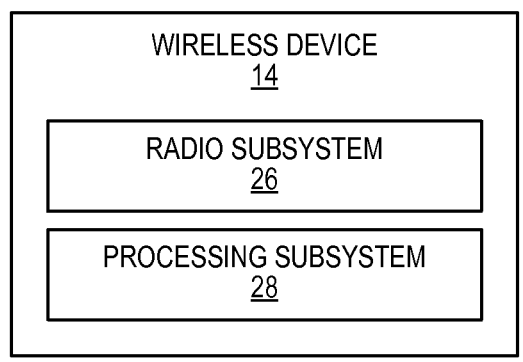

FIG. 6 schematically illustrates the difference between time stamping for an MDT measurement log and time stamping for an RRC connection establishment failure log;

FIG. 7 illustrates a cellular communications network that enables controlling of log reporting and/or logging of data based on one or more constraints according to one embodiment of the present disclosure;

FIG. 8 illustrates a process for controlling log reporting and/or logging of data according to one embodiment of the present disclosure;

FIG. 9 illustrates a process performed by a logging node to control log reporting and/or logging of data according to one embodiment of the present disclosure;

FIG. 10 illustrates the operation of a wireless device to perform early, or proactive, reporting of logged data according to one embodiment of the present disclosure;

FIG. 11 illustrates the process of FIG. 10 in more detail according to one embodiment of the present disclosure;

FIG. 12 illustrates a process by which a network node controls log reporting and/or logging of data by a logging node according to one embodiment of the present disclosure;

FIG. 13 illustrates a process for controlling log reporting and/or logging of data based on a timing constraint according to one embodiment of the present disclosure;

FIG. 14 illustrates a process for controlling log reporting and/or logging of data based on a quality constraint according to one embodiment of the present disclosure;

FIG. 15 illustrates a process for controlling log reporting and/or logging of data based on a probability of loss constraint according to one embodiment of the present disclosure;

FIG. 16 illustrates exchange of capability information between two nodes according to one embodiment of the present disclosure;

FIG. 17 is a block diagram of a network node according to one embodiment of the present disclosure; and FIG. 18 is a block diagram of a wireless device according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to enhanced log reporting and logging of data in a wireless communications network. In particular, embodiments are disclosed herein for controlling log reporting and/or logging of data based on one or more constraints. In some of the embodiments described herein, the cellular communications network is a Long Term Evolution (LTE) cellular communications network. However, the concepts disclosed herein are not limited to LTE and may be used in any suitable cellular communications network or, more generally, any suitable wireless communications network. For instance, the embodiments described herein may apply to any Radio Access Network (RAN) or single or multiple Radio Access Technology (RAT). Other than LTE, some other RAT examples are LTE Time Division Duplexing (TDD), LTE-Advanced, Universal Mobile Telecommunications System (UMTS), High Speed Packet Access (HSPA), Global System for Mobile Communications (GSM), Code Division Multiple Access (CDMA) 2000, WiMAX, and WiFi. The embodiments described herein also apply to single-carrier, multi-carrier, multi-RAT, and Carrier Aggregation (CA) networks.

While the concepts disclosed herein are not limited by any particular problem to be solved, before discussing embodiments of the present disclosure, a brief discussion of some examples of problems related to current Minimization of Drive Tests (MDT) logging and reporting and Radio Resource Control (RRC) connection establishment failure logging and reporting in UMTS and LTE are described. While embodiments of the systems and methods disclosed herein may be used to address or overcome these problems, the present disclosure is not limited thereto. Embodiments disclosed herein may be used to address additional or alternative problems.

For some MDT logs, a time stamp at reporting is made and an accuracy requirement may be defined for the time stamp. However, MDT logs may be stored for up to 48 hours according to $3^{rd}$ Generation Partnership Project (3GPP) specifications or even longer in practice. During such a long storage time of an MDT log, there may be a large time drift which may degrade the accuracy of the time stamp at the time of reporting. This time drift represents an accumulated error in the clock or clocks used by the User Equipment device (UE) with respect to some absolute time or a reference time used by a network node that will be interpreting the UE's measurements. After a long storage time (e.g., 48 hours), this time drift will make the time stamp at reporting very inaccurate, and the reported information in the MDT log may be difficult to use in a correct way in the cellular communications network, which will in turn reduce the benefits of the MDT feature.

Currently, the accuracy requirement for a relative time stamp for logged MDT is ±2 seconds per hour (s/hr). However, the relative time stamp for a logged measurement is defined as the time from the moment the MDT configuration was received at the UE until the measurement was logged, and the duration of the logging can be up to a maximum of two hours. Thus, the maximum error due to drift at the end of two hours is ±4 seconds. The situation is different for an RRC connection establishment failure log, where the relative time stamp is defined as the elapsed time between logging an RRC connection establishment failure and reporting the log, i.e., up to 48 hours. Therefore, reusing the same accuracy requirement for RRC connection establishment failure log time stamping as that used for logged MDT time stamping would lead to an error of up to 96 seconds, which is not acceptable from the cellular communications network point of view. On the other hand, not all UEs may be capable of having a better accuracy, which may be more costly and may require a separate clock for RRC connection failure log reporting.

Systems and methods are disclosed herein that can be used to address the issues discussed above by controlling log reporting and/or logging of data based upon one or more constraints (e.g., timing constraint(s), quality constraint(s), probability of loss constraint(s), reliability constraint(s), resource constraint(s), and/or the like). While these systems and methods may be used in any suitable type of wireless network, in the embodiments described herein, the systems and methods are used in a cellular communications network and, in particular, a UMTS or LTE/LTE-Advanced cellular communications network.

In this regard, FIG. 7 illustrates a cellular communications network 10 according to one embodiment of the present disclosure. The cellular communications network 10 is preferably a UMTS or an LTE/LTE-Advanced cellular communications network. As illustrated, the cellular communications network 10 includes a RAN (e.g., a Universal Terrestrial Radio Access Network (UTRAN) or Evolved UTRAN (E-UTRAN)) that includes a number of base stations 12 that provide wireless access to a number of wireless devices 14, which may also be referred to herein as UEs. The base stations 12 are connected, directly or indirectly (e.g., through a Radio Network Controller (RNC)), to a core network 16. Note that the cellular communications network 10 may include numerous types of nodes that are not illustrated in FIG. 7 such as, for example, relays, mobile relays, Location Management Units (LMUs), Self-Optimizing Network (SON) nodes, low-power or small-cell base stations (e.g., femto base stations, pico base stations, and/or home base stations), or the like.

Before continuing, a number of definitions are beneficial. As used herein, a "radio node" is characterized by its ability to transmit and/or receive radio signals and it comprises at least a transmitting or receiving antenna. A radio node may be a wireless device (i.e., a UE) or a radio network node.

The terms wireless device and UE are used interchangeably in this disclosure. As used herein, a "wireless device," or UE, is any device equipped with a radio interface and capable of at least transmitting or receiving a radio signal from another radio node. A wireless device may also be capable of receiving and demodulating a signal. Note that even some radio network nodes, e.g., a femto Base Station (BS) (which is also known as a home BS) or LMU, may also be equipped with a UE-like interface. Some examples of a wireless device that are to be understood in a general sense are a Personal Digital Assistant (PDA), a laptop, a mobile phone, a tablet device, a sensor, a fixed relay, a mobile relay, or any radio network node equipped with a UE-like interface (e.g., a small Radio Base Station (RBS), an Evolved Node B (eNB), a femto BS, or an LMU). Additionally, the wireless devices described herein may represent Machine Type Communication (MTC)/Machine-to-Machine (M2M) communication devices or other devices that only have limited communication capabilities. For example, the described wireless devices may represent devices, such as a wireless meter or sensor, that are capable of transmitting data but that lack or have limited ability to receive wireless transmissions. Similarly, the described wireless devices may represent devices, such as an electronic billboard, that are capable of receiving data but that lack or have limited ability to transmit wireless transmissions.

As used herein, a "radio network node" is a radio node comprised in a radio communications network. A radio network node may be capable of receiving radio signals or transmitting radio signals in one or more frequencies, and may operate in single-RAT, multi-RAT or multi-standard mode (e.g., Multi-Standard Radio (MSR)). A radio network node, including a base station (e.g., an eNB), a pico eNB or Home eNB (HeNB), a radio access point, a Remote Radio Head (RRH), a Remote Radio Unit (RRU), a relay, a mobile relay, a transmitting-only/receiving-only radio network node, or a RNC, may or may not create its own cell. Some examples of radio network nodes not creating their own cells are beacon devices transmitting configured radio signals or measuring nodes receiving and performing measurements on certain signals (e.g., LMUs). A radio network node may also share a cell or the used cell ID with another radio node which creates its own cell. Further, a radio network node may operate in a cell sector or may be associated with a radio network node creating its own cell. More than one cell or cell sectors (commonly named in the described embodiments by a generalized term "cell" which may be understood as a cell or its logical or geographical part) may be associated with one radio network node. Further, one or more serving cells (in downlink and/or uplink) may be configured for a wireless device, e.g., in a carrier aggregation system where a wireless device may have one Primary Cell (PCell) and one or more Secondary Cells (SCells). A cell may also be a virtual cell (e.g., characterized by a cell Identifier (ID) but not provide a full cell-like service) associated with a transmit node. A radio network node (e.g., an eNB, an RNC, a radio access point, etc.) may be a node controlling a wireless device.

A network node may be any radio network node or core network node. Some non-limiting examples of a network node are an eNB (also a radio network node), a RNC, a positioning node, a Mobility Management Entity (MME), a Public Safety Answering Point (PSAP), a SON node, an MDT node (also interchangeably used with a "Trace Collection Entity (TCE)" at least in some embodiments), a coordinating node, a gateway node (e.g., a Packet Data Network Gateway (P-GW), a Serving Gateway (S-GW), an LMU gateway, or a femto gateway), and an Operation and Management (O&M) node.

The term "coordinating node" used herein is a network and/or node, which coordinates radio resources with one or more radio nodes. Some examples of the coordinating node are a network monitoring and configuration node, an Operational Support System (OSS) node, an O&M node, an MDT node, a SON node, a positioning node, an MME node, a gateway node such as a P-GW or a S-GW network node, a femto gateway node, an LMU gateway connecting multiple LMUs, a macro node coordinating smaller radio nodes associated with the macro node, an eNB coordinating resources with other eNBs, etc.

The signaling described herein is either via direct links or logical links (e.g., via higher layer protocols and/or via one or more network and/or radio nodes). For example, signaling from a coordinating node to a UE may also pass another network node, e.g., a radio network node. The term "subframe" used in the embodiments described herein (typically related to LTE) is an example resource in the time domain, and in general it may be any predefined time instance or time period.

FIG. 8 is a flow chart that illustrates a process for controlling log reporting and/or logging of data according to one embodiment of the present disclosure. This process is performed by a node in the cellular communications network 10 of FIG. 7, where the node may be, for example, one of the wireless devices 14, a radio network node (e.g., one of the base stations 12), or a core network node (i.e., a node in the core network 16). In general, the process of FIG. 8 controls log reporting and/or logging of data by a logging node taking into account one or more constraints such as, for example, accuracy, validity, and/or predicted availability (e.g., at a time of reporting) of the logged data and/or data associated with the logged data. The logging node may or may not be the same node as the node performing the process of FIG. 8. Notably, in this example, the logging node is one of the wireless devices 14; however, the logging node is not limited thereto.

First, the node determines whether logged data logged by one of the wireless devices 14 on a log (e.g., an MDT log or an RRC connection establishment failure log), data associated with the logged data (e.g., time stamps and/or location information), data to be logged by the wireless device 14, and/or data associated with the data to be logged by the wireless device 14 satisfies one or more constraints (step 400). The one or more constraints may, for example, be predefined or configured by the cellular communications network. In general, the one or more constraints include one or more timing constraints (e.g., time stamp constraint(s) or time association constraint(s)), one or more quality constraints, one or more probability of loss constraints, one or more reliability constraints, one or more resource constraints, or the like, or any combination thereof. More specifically, in one embodiment, the one or more constraints include one or more of the following: timing constraint(s), quality constraint(s), probability of loss constraint(s), reliability constraint(s), and/or resource constraint(s).

The timing constraint(s) may include one or more timing constraints such as one or more time association constraints, e.g., a constraint related to an amount of time that has elapsed since the last data (e.g., measurement) was logged or a constraint related to a time stamp associated with the logged data. The quality constraint(s) may include one or more quality constraints for a predicted or current quality of the logged data, data associated with the logged data, data to be logged, and/or data associated with the data to be logged. For example, the quality constraint(s) may include an accuracy constraint for a relative time stamp of the entire logging report or part of the logged data at the time of reporting and/or a quality constraint for an accuracy and validity of location data associated with the log, the logged data, or data to be logged. Note that as used herein, the "log" is the content (i.e., the logged data and, in some embodiments, the data associated with the logged data), whereas the "report" is what is to be reported and includes all or a portion of the log and, if not included in the log, all or a portion of the data associated with the log.

The probability of loss constraint(s) may include one or more probability of loss constraints regarding a probability of loss of the logged data, data associated with the logged data, data to be logged, and/or data associated with the data to be logged. For example, the probability of loss constraints may include a constraint related to a predicted loss or validity expiration of the logged data (e.g., the log duration timer is still running when the wireless device 14 switches to another Public Land Mobile Network (PLMN) or another area). As another example, the probability of loss constraints may include a constraint related to a predicted loss, validity, or availability of location data (e.g., validity of location data may expire and old location information may become unavailable, while obtaining new location data may be more difficult or not possible, e.g., due to switching to another RAT, or the new location is likely to be inaccurate).

The reliability constraint(s) may include one or more reliability constraints regarding a reliability level of the data (logged data, data associated with the logged data, data to be logged, and/or data associated with the data to be logged). The reliability level of the data may depend on a quality, stability, and/or source of the data (e.g., a measurement may be accurately measured or indicated to be so, but the source may be not trustable). As an example, some positioning methods or radio network nodes may be perceived as more reliable. For instance, user-deployed femto BSs may be less reliable even if they report good positioning measurement accuracy or an accurate final location calculated in the node. A set of reliable sources or methods of obtaining the data may be described, e.g., by a list of identifications or parameters characterizing the reliability. The list may be, e.g., predefined or dynamically configurable.

The one or more reliability constraints may include one or more constraints on the reliability of location data associated with the logged data or to be associated with data to be logged. As discussed below, such a reliability constraint may be used to control log reporting and/or logging of data by the wireless device 14. For example, the wireless device 14 may continue logging provided that the location, or positioning, of the wireless device 14 can be determined by the wireless device 14 with at least certain accuracy. The wireless device 14 may then stop logging data when the determined location, or position, of the wireless device 14 is inaccurate beyond a predefined level, which can be predefined or configured by the cellular communications network. If the positioning accuracy cannot be maintained, then the wireless device 14 may proactively report the available logged measurements until then to the cellular communications network, e.g., by accessing the cellular communications network even if the wireless device 14 is in a low activity state. For example, if the wireless device 14 cannot receive signals from a sufficient number of navigational satellites (e.g., three or more Global Positioning System (GPS) satellites), then the wireless device 14 may perform immediate or proactive reporting of the logged data to the cellular communications network. The wireless device 14 may also indicate to the cellular communications network the reason of proactive reporting, i.e., due to deteriorating positioning information.

The reliability constraint(s) may additionally or alternatively include a constraint related to a reliability level of the logged measurement or logged measurement accuracy, e.g., the wireless device 14 logs measurements provided that a certain level of predefined accuracy is met. Still further, the reliability constraints(s) may additionally or alternatively include a constraint related to the reliability level of the time stamping for the logged data or accuracy of a timer associated with the logged data. Such a reliability constraint may be used to control the logging and/or reporting of data, as discussed below. For example, the wireless device 14 may log measurements, associated data, and/or any data desired to be logged provided that a certain level of predefined accuracy of the time stamping or timer can be met. If the accuracy cannot be maintained, then the wireless device 14 proactively reports the available logged data to the cellular communications network, e.g., by accessing the cellular communications network even if the wireless device 14 is in a low activity state.

The one or more resource constraints may include, for example, a constraint related to whether an overflow or limitation of memory required for logging occurs or is expected to occur. For example, the wireless device 14 may share a total available memory between logging and for other process and procedures, e.g., measurements for cell reselection, offline services used by a subscriber, etc. The one or more resource constraints may include one or more hardware resource constraints or limitations (e.g., a processing limitation of the processors has been reached or is expected to be reached). For example, due to a combination of logging and other processes (e.g., measurements, other offline applications such as use of a camera of the wireless device 14, etc.) which are ongoing in parallel over a certain amount of time, the wireless device 14 is unable to continue logging MDT measurements or logging results may not reach the predefined requirements. One or more hardware constraints may be defined to detect this situation.

The one or more resource constraints may additionally or alternatively include one or more constraints related to a battery power level of the wireless device 14. The one or more constraints may be defined to detect when the battery power of the wireless device 14 falls below a threshold, when the battery power of the wireless device 14 is expected to drain, or when an energy or power consumption rate for the battery of the wireless device 14 is above a threshold (e.g., over a recent period T due to a power consuming operation such as heavy traffic exchange or uplink transmission by the wireless device 14 at a high power level due to bad a radio environment). The wireless device 14 may lose the logged measurement results if the battery is fully drained since, in this case, the wireless device 14 will flush its memory.

In one embodiment, the logged data (or data to be logged) is logged measurements for MDT purposes (i.e., the log is an MDT log) and/or logged data for an RRC connection establishment failure (i.e., the log is an RRC connection establishment failure log). However, the logged data (or data to be logged) may additionally or alternatively include logged data (or data to be logged) for a radio measurement log, a random access failure log, a paging channel failure log, a broadcast channel failure log, and/or a radio link failure log. The logging may be for a particular technology, e.g., LTE, Universal Terrestrial Radio Access (UTRA), or GSM/Global System for Mobile Communications Edge Radio Access Network (GERAN). In some specific embodiments, the logging may be associated with a specific activity state (e.g., RRC_IDLE or a low-activity state with suspended or reduced reporting possibility) of the logging node.

The logged data (or equivalently the data to be logged) may be, e.g., any one or any combination of:
  Accessibility measurements, e.g., RRC establishment failure such as described above, number of connection establishment and/or reestablishment attempts, a number of transmitted preambles, etc.,
  Positioning measurements (e.g., UE Receive (Rx)-Transmit (Tx), Round Trip Time (RTT), Tracking Area (TA), Enhanced Cell ID (E-CID) measurements, or Observed Time Difference of Arrival (OTODA) measurements such as Reference Signal Time Difference (RSTD)),
  Cell identification (e.g., the serving cell Physical Cell ID (PCI) or E-UTRAN Cell Global ID (ECGI) or failed cell identification), Radio environment measurements for one or more RATs (e.g., LTE, GERAN, UTRA, or CDMA20000), e.g.:
  Received signal strength, received signal quality, received pilot phase, received interference (e.g., Received Signal Strength Indicator (RSSI)),
  Channel Quality Indicator (CQI),
  Best measured cells with corresponding radio measurements (e.g., collected until handover or until detected by the wireless device 14 Radio Link Failure (RLF)), and
  Additional system information (e.g., indication of Closed Subscriber Group (CSG) member status for a cell),
Transmit power indication (e.g., an indication of whether the maximum transmit power has been reached by the wireless device 14),
Contention detection indicator,
Data related to failure of specific channels (e.g., Random Access Channel (RACH), broadcast channels, paging, or control channels) or specific data type (e.g., failure of system information reading),
Data related to RLF,
Characteristic or statistics related to TA measurement, TA command, or timing synchronization,
Timing measurements, e.g., received time difference of signals from any two cells, e.g., between a serving cell and a neighboring cell:
  Example: The cellular communications network may use this information and wireless device 14 location to adjust the frame timing between cells, and
Resource usage or utilization at the wireless device 14 for performing one or more task, procedure, or process:
  Resource utilization may be resource utilization when performing online tasks or offline tasks or both types of tasks. The online tasks are related to wireless communication, e.g., radio measurement on serving or neighboring cells, connection establishment, online gaming, etc. The offline tasks are those which do not require network connection, e.g., offline music, use of camera, offline video, etc. Examples of wireless device resources are memory or buffer size, processing power or processor or hardware ability, battery power, transmission power, etc. Examples of tasks are any type of measurement or any offline tasks (e.g., use of any application supported by the operating system such as word processing, music, use of camera, etc.). This is described by a few examples:
    In one example, the wireless device 14 can be configured by the cellular communications network to log the amount of memory or percentage of memory used and/or the percentage of processing resources used when performing certain radio measurements (e.g., intra-LTE periodic and event triggered measurements) over a certain time period, e.g., one hour.
    In another example, the wireless device 14 can be configured by the cellular communications network to log the amount of memory or percentage of memory and/or the percentage of processing resources and/or memory or the percentage of battery power used when using certain offline services (e.g., music).
Some examples of the data associated with the logged data (or equivalently the data associated with the data to be logged), which may also be referred to herein as auxiliary or supplementary information or data, may include one or more of, e.g.:
  Time stamp or time association which may be used, e.g., for associating a corresponding report to a certain event which might cause a logged event and/or for associating with a location available from a source other than the log report, e.g., by means of network-based positioning,
  Location data (e.g., location data that is indicative of the location(s) at which the logged data was measured/obtained),
  Radio conditions under which the data was logged, and
  Environmental conditions under which the data was logged.

Examples of radio conditions under which data may be logged are any combination of: user speed or Doppler frequency, delay spread or multiple path delay profile of the radio channel, or level of signal dispersion. For example, the wireless device 14 may log that certain measurement results (e.g., MDT measurements) were obtained when its average Doppler speed was 50 Hertz (Hz) and average delay spread of the radio channel was 1 microsecond (μs). In another example, the wireless device 14 may indicate the radio conditions in terms of discrete levels, e.g., channel conditions when certain measurements were logged. As a specific example, the wireless device 14 may log that certain measurements were obtained when the wireless device 14 was experiencing medium Doppler speed and medium delay spread. In this case, the discrete levels of the radio conditions may be predefined or configured by the cellular communications network when configuring the wireless device 14 to log the data. This information will enable the cellular communications network to more accurately use the logged data for performing network planning and management tasks, e.g., setting and tuning of radio network parameters such as maximum output power, reference signal transmit power, tilting of antenna to adjust radio conditions, etc. It may also be predefined or the wireless device 14 may be configured to log certain measurements or data provided the wireless device 14 operates in certain radio conditions. For example the network node might require logged measurements only when they are performed in certain conditions, e.g., when Doppler speed is above a threshold.

Examples of the environmental conditions under which data may be logged are temperature, humidity, voltage, vibration, air pressure, etc. These factors can affect the accuracy of logged data (e.g., the accuracy of logged measurements). The environmental conditions can also be expressed in discrete terms, which can be predefined, e.g., normal conditions and extreme conditions or normal, moderate, and extreme conditions. For example, when the temperature is below −10° Celsius (C) or above 35° C., then the wireless device 14 may be assumed to operate in an extreme condition. According to this aspect of the present disclosure, the wireless device 14 also logs one or more environment conditions such as temperature under which one or more measurement data is logged. The wireless device 14 may log the one or more environmental conditions as discrete values. Alternatively, the wireless device 14 may only log environmental conditions when they are extreme while logging the data. Otherwise, it may be assumed that the wireless device 14 was operating under normal conditions when the data was logged. Logging environmental conditions only when they are extreme will reduce signaling overhead and minimize effort for logging the environmental conditions. The wireless device 14 may log the environmental conditions when logging data even in higher RRC activity states, e.g., RRC connected or CELL_DCH states, etc. The wireless device 14 may perform this when configured by the network or when a certain condition is met, e.g., when the observed environmental condition changes.

Once the determination in step 400 is made, the node controls log reporting and/or logging of data by the wireless device 14 based on the determination (step 402). In one embodiment, the node controls reporting of the log containing the logged data by the wireless device 14 based on the determination in step 400. The node may control reporting of the log by initiating reporting of the log (e.g., prior to a pre-configured time at which the log would normally be reported). In another embodiment, the node may control reporting of the log by suspending or delaying the reporting of the log. In yet another embodiment, the node may control reporting of the log via a sequence of control decisions, or actions, e.g., initiating suspending of the reporting of the log and then suspending the reporting of the log. In one example, the log is reported all at one time (e.g., the full set of logged data is reported via a single report in one or more messages, e.g., due to the size of the log). In this case, controlling the reporting of the log may, for example, initiate early reporting of the log in response to the determination in step 400. In another example, the log (e.g., different portions of the log) may be reported at different times, in which case controlling of the reporting of the log may include determining a reporting schedule for the log. Controlling of the reporting of the log may apply to the entire log (i.e., the entire set of logged data) or only part of the log (e.g., one or more specified types of logged data, e.g., logged data associated with accessibility measurements, or a certain amount or portion of a larger data set).

As discussed below, in one embodiment, the initiation of reporting may also comprise initiation of establishing or re-establishing a connection to a radio network or to a desired RAT or network (e.g., a desired RAN or PLMN). In this embodiment, the initiation may start when the logging node is not in a connected state (e.g., the wireless device 14 is in RRC_IDLE). Still further, initiation of reporting of the logged data may include initiation of reporting when logging of the data is complete. In another embodiment, the initiation may comprise proactive initiation of reporting while the logging is still ongoing.

Controlling of the logging of data may include suspending, postponing, or delaying the logging of data by the wireless device 14. In another embodiment, the node may control logging by resuming previously suspended, postponed, or delayed logging. In yet another embodiment, the node may control logging via a sequence of control decisions (e.g., suspending and resuming) for the logging. In yet another embodiment, the node may control logging by determining a logging schedule. The node may control logging for the entire set of data being logged or only part of the entire set of data being logged (e.g., a certain type of data, e.g., associated with accessibility measurements). Notably, while controlling reporting and logging are discussed separately above, in another embodiment, the node controls both reporting and logging.

Again, the process of FIG. 8 may be performed by any node. For instance, in one embodiment, the process of FIG. 8 is performed by the logging node, where the logging node may be one of the wireless devices 14, a relay, a mobile relay, etc. In another embodiment, the process of FIG. 8 may be performed by a node other than the logging node such as, for example, a radio network node (e.g., an eNB, a RBS, an RNC, or a TCE), a network node, or a wireless device 14.

The techniques by which the node controls the reporting and/or logging by the logging node may include one or more of the following:
  Autonomously controlling reporting and/or logging in the logging node,
  Controlling reporting and/or logging based on one or more predefined rules,
  Controlling reporting and/or logging based on the location data (e.g., UE-based, UE-assisted, or network-based location of the logging node, depending on the node implementing the controlling function),
  Controlling reporting and/or logging based on radio measurements,
  Controlling reporting and/or logging based on Layer-2 measurements,
  Controlling reporting and/or logging based on historical data, e.g., for the same logging node in the same area,
  Controlling reporting and/or logging based on statistics collected for multiple wireless devices 14 in the same area, e.g.:
    Service performance statistics,
    Connection failure statistics in an area and neighboring areas which are related to the possibility for reporting,
    Logged data quality statistics,
    Logged data reporting probability in an area, and
    Positioning methods availability and Global Navigation Satellite System (GNSS) accessibility in an area, etc., and
  Controlling reporting and/or logging by triggering controlling of reporting and/or logging based on a condition, an event, or a timer:
    Some examples of conditions or events that may be used as triggers are: signal level, signal quality, radio conditions, proximity to or location in a certain area, resource utilization or amount of available resources (e.g., memory, buffer size, etc.) for logging, etc.

Controlling of the reporting and/or logging may also take into account, e.g., an importance of the log (e.g., there may be sufficient MDT reports already collected in a certain local area or for certain UE types), time of the day, network load, and time necessary to establish the connection of reporting (e.g., based on a predefined requirement, statistics, or history) and/or to report the log. Also, it should be noted that, in one embodiment, an activity state (e.g., going to RRC_IDLE state or back to RRC_CONNECTED) of the logging device may be based on the controlling described herein. In another embodiment, the activity state of the logging device remains the same before and after applying the controlling described herein.

As discussed above, the node that performs the process of FIG. 8 may be the logging node. In this regard, FIG. 9 is a flow chart that illustrates the operation of the logging node to control reporting and/or logging according to one embodiment of the present disclosure. As illustrated, the logging node logs data (step 500). The logged data may be, for example, logged measurements for MDT purposes or logged data for an RRC connection establishment failure. The logged data may additionally or alternatively include other types of logged data such as, for example, logged data for a radio measurement log, logged data for a random access failure log, logged data for a paging channel failure log, logged data for a broadcast channel failure log, and logged data for a radio link failure log. The logging node determines whether the logged data, data associated with the logged data, data to be logged, and/or data associated with the data to be logged satisfies one or more constraints, as described above (step 502). Based on the determination, the logging node controls log reporting and/or logging of data at the logging node (step 504).

In one embodiment, the logging node controls reporting of the logged data based on the determination in step 502. More specifically, the logging node proactively reports the logged data (or some portion thereof) in response to the determination in step 502 (e.g., reports an MDT log early if the accuracy of time stamping falls below a threshold). Proactively reporting the logged data may include, for example, sending an indication of the logged data availability to the cellular communications network. Proactively reporting the log (or some other manner of controlling reporting and/or logging) may also include initiating a connection establishment or reestablishment to the cellular communications network based on at least one of the constraints, wherein initiating the connection may include, e.g., sending an RRC connection request message to the RAN.

Rather than initiating reporting of the logged data, the logging node may alternatively suspend reporting, postpone or delay reporting, suspend logging, or postpone or delay logging. For example, based on the determination in step 502, the logging node may decide to not report the logged data at a certain time or in certain conditions or decide to report the logged data at a different time (i.e., a time different than a pre-configured time at which the logged data would have normally been reported).

FIG. 10 illustrates the operation of one of the wireless devices 14 to perform early or proactive reporting of logged data according to one embodiment of the present disclosure. As illustrated, the wireless device 14 logs data (step 600). The logged data may be, for example, logged measurements for MDT purposes or logged data for an RRC connection establishment failure. The wireless device 14 determines whether the logged data, data associated with the logged data, data to be logged, and/or data associated with the data to be logged satisfies one or more constraints, as described above (step 602). Based on the determination, the wireless device 14 initiates reporting of the logged data prior to a pre-configured time at which the logged data would have normally been reported (step 604). In response, the wireless device 14 reports the logged data, or some portion thereof, to the RAN (e.g., the serving base station 12) (step 606). The RAN stores and/or utilizes (e.g., sends a corresponding trace record to the appropriate TCE) the logged data reported by the wireless device 14 (step 608).

FIG. 11 illustrates the process of FIG. 10 in more detail according to one particular embodiment of the present disclosure. In this embodiment, the logged data is measurements for MDT purposes (i.e., MDT measurements).

Thus, the wireless device 14 receives an MDT configuration from the RAN (step 700). The wireless device 14 then enters the idle mode (step 702) and begins logging MDT measurements (step 704). Normally, the wireless device 14 would log MDT measurements for an amount of time (which is referred to as the log duration timer) defined in the MDT configuration). Sometime while the wireless device 14 is logging MDT measurements or sometime after the wireless device 14 has completed logging MDT measurements but before the wireless device 14 would normally report the resulting MDT log, the wireless device 14 determines whether the logged MDT measurements, data associated with the logged MDT measurements (e.g., time stamping and/or location), MDT measurements to be logged, and/or data associated with the MDT measurements to be logged satisfy one or more constraints, as described above (step 706).

In this embodiment, based on the determination, the wireless device 14 initiates reporting of the MDT log prior to a pre-configured time at which the wireless device 14 would have normally reported the MDT log (step 708). In response to initiating the report, the wireless device 14 initiates establishment of an RRC connection by sending an RRC connection request to the RAN (step 710). Currently, under 3GPP standards, RRC connection may be requested, e.g., for the following purposes: upper layers indicate that the RRC connection is subject to Extended Access Barring (EAB) (Technical Specification (TS) 24.301), for mobile terminating calls, for emergency calls, for mobile originating calls, for mobile originating signaling, or for mobile originating Circuit Switched (CS) fallback. The initiation of the RRC connection in steps 708 and 710 is based on at least one of the constraints described herein (i.e., a resource or quality constraint). This purpose may be comprised in an existing purpose (e.g., for mobile originating signaling) or in a new purpose (e.g., UE-initiated reporting, UE-initiated log reporting, or for mobile-initiated MDT reporting). The wireless device 14 may also indicate the purpose in an establishmentCause included in the RRC connection request message.

Notably, the time at which the wireless device 14 would normally report the MDT log may be a time at which the wireless device 14 establishes or re-establishes a connection to a RAN of the appropriate RAT for a purpose other than log reporting (e.g., originating a call). However, in steps 708 and 710, the RRC connection is established for the purpose of sending the MDT log, which was triggered based on the one or more constraints (e.g., time stamping accuracy or quality falling below a predefined threshold or time elapsed since the last logged measurement being greater than a predefined threshold amount of time after which a drift of the clock(s) used for time stamping exceeds a predefined threshold). In this manner, the wireless device 14 proactively reports the MDT log based on the one or more constraints at a time that is before the time at which the MDT log would have normally been reported.

In response to the RRC connection request, the RAN returns an RRC connection setup message to the wireless device 14 (step 712). The wireless device 14 then sends an RRC connection setup complete message including an indication that the MDT log is available to the RAN (step 714). In response, the RAN sends a UE information request message that requests the MDT log (step 716). The wireless device 14 then returns a UE information response including the MDT log to the RAN (step 718). The RAN then stores the MDT log to a trace record(s) (step 720) and sends the trace record(s) to the appropriate TCE (step 722).

Notably, in some embodiments, the wireless device 14 may perform a random access procedure in order to establish a connection for reporting logged data (e.g., an MDT log or an RRC connection establishment failure log). Based on the controlling function, the wireless device 14 may try to establish a connection or reselect to a RAT, RAN, or PLMN to enable log reporting. In addition or alternatively, the wireless device 14 may try to signal a beacon signal or a predefined physical signal in an attempt to initiate reporting and/or establish a connection for log reporting.

While FIGS. 9 through 11 relate to embodiments where the logging node controls reporting and/or logging, FIG. 12 illustrates a process by which a network node (e.g., one of the base stations 12) controls reporting and/or logging of a logging node (e.g., one of the wireless devices 14). As illustrated, the network node determines whether logged data logged by a logging node (which in this example is one of the wireless devices 14), data associated with the logged data, data to be logged by the wireless device 14, and/or data associated with the data to be logged by the wireless device 14 satisfies one or more constraints, as described above (step 800). Notably, the network node may obtain any information need for the determination in step 800 from any suitable source (e.g., from the wireless device 14).

Based on the determination, the network node controls log reporting by the wireless device 14 and/or logging of data by the logging node (step 802). As discussed above, the network node may initiate, postpone, delay, or suspend log reporting by the wireless device 14 and/or postpone, delay, or suspend logging by the wireless device 14. Further, in one embodiment, the network node may also trigger establishing or re-establishing a connection of the wireless device 14 to a certain RAT, RAN, or PLMN for log reporting. The network node may use any data available in the cellular communications network to determine whether the one or more constraints are satisfied and to perform controlling of reporting and/or logging by the wireless device 14. For instance, the network node may obtain one or more measurements for use in determining whether the one or more constraints are satisfied. When a constraint is satisfied, the network node may trigger a controlling function, e.g. establishing a function with the wireless device 14, polling the wireless device 14 for the logged data, indicating to the wireless device 14 that the network node is available for collecting the logged data, configuring/scheduling or reserving resources (e.g., time and/or frequency slot) to enable the wireless device 14 to report the logged data before the data is lost or the quality of the logged data is degraded, etc.

FIGS. 13 through 15 illustrate embodiments where specific examples of constraints are used to trigger controlling of log reporting and/or logging of data. Note that the examples of FIGS. 13 through 15 are only examples and are not to be construed as limiting the scope of the present disclosure. Further, similar processes may be used for other types of constraints. Specifically, FIG. 13 is a flow chart that illustrates a process for controlling reporting and/or logging based on a timing constraint according to one embodiment of the present disclosure. As illustrated, a node (e.g., the logging node or another node) analyzes timing data (e.g., time stamps) associated with logged data is analyzed to provide a timing parameter (e.g., an amount of time that has elapsed since the last log or the most recent time stamp for the logged data) (step 900). The node then determines whether a timing constraint is satisfied based on the timing parameter (step 902). The node then controls reporting and/or logging by the logging node based on the determination in step 902 (step 904).

For example, the node may analyze the timing information associated with the logged data to evaluate an amount of time that has elapsed since the last log, e.g., by comparing the amount of time that has elapsed since the last log to one or more thresholds and a maximum time during which the logged data may be stored. If the elapsed time T is below a first threshold T1 but less than the maximum time Tmax that the logged data may be stored (T<T1<Tmax), no action is needed; if the elapsed time is above the first threshold but does not exceed a second threshold T2 (T1<T<T2<Tmax), the node attempts to report the logged data (the attempt may also comprise establishing a connection to the RAN); if the elapsed time is above the second threshold (T>T2), the node concludes that the timing accuracy of the time stamping (e.g., a relative time stamp) may not meet a predefined requirement and may or may not keep the log, depending on a condition. In one embodiment, the log may be an RRC connection establishment failure log, where the maximum time that can elapse between the time of the failure and reporting is 48 hours according to current 3GPP specifications. Using this process, the RRC connection establishment failure log can be reported to the cellular communications network before a drift of the time stamping exceeds some predefined quality or accuracy threshold (quality constraint).

In the example above, if the elapsed time is above the second threshold (T>T2), the node may perform an action that would lead to erasing or overwriting the log. In this manner, a log with poor time stamp accuracy can be erased before the log is reported to the cellular communications network using traditional reporting mechanisms. For an RRC connection establishment failure log, one example of an action that would lead to erasing or overwriting the log is causing the logging node to attempt a connection that the node knows is likely to fail such that the log is overwritten with a new RRC connection establishment failure log, which thereby extends the possible log reporting time for the new log.

FIG. 14 is a flow chart that illustrates a process for controlling reporting and/or logging based on a quality constraint according to one embodiment of the present disclosure. As illustrated, a node (e.g., the logging node or another node) obtains one or more current or predicted quality measurements for the logged data logged by a logging node, data associated with the logged data, data to be logged by the logging node, and/or data associated with the data to be logged by the logging node (step 1000). The node may obtain the quality measurements using any suitable technique. The node then determines whether one or more quality constraints are satisfied based on the quality measurement(s) (step 1002). The node then controls reporting and/or logging by the logging node based on the determination in step 1002 (step 1004).

The quality measurement(s) may characterize the entire set of the data or one or more of parts of the data. The quality measurement(s) may be indicative of the current quality of the data, e.g., at a certain time or over a certain time period, or predicted quality of the data (e.g., at a time of expected reporting or after a certain time when the environment is expected to change). The quality measurements may comprise, e.g.:

Completeness of the logged data and of a corresponding report (e.g., whether valid location data is or will be available), Accuracy of the logged (and/or to be logged) data, e.g.:
  Measurement accuracy or uncertainty,
  Confidence level associated with measurement accuracy or uncertainty,
  Number of measurement samples (e.g., sufficient/insufficient samples), and/or
  Variance in the measurement samples, and/or Accuracy of the data associated with the log, e.g.:
  Location accuracy, and/or
  Relative time stamp accuracy (e.g., accuracy of a relative time stamp for an RRC connection establishment failure log).

An action related to controlling log reporting may be based, e.g., on evaluating one or more of the obtained quality measurement(s) or comparing them to respective one or more reference quality values. A reference quality value may be an absolute value, a relative value, a percentage, a rate, or even an indication of a trend (e.g., degradation of the logged data quality over a last time period compared to a reference time period or the previous time period).

Some examples of actions that may be taken by the node to control log reporting by the logging node are:

The node is in RRC_IDLE mode and initiates an RRC connection to one of the base stations 12 to enable reporting of an RRC connection establishment failure log to meet a predefined accuracy requirement for the relative time stamp for this log report.

The node postpones log reporting when location accuracy is below a threshold or if the location data will shortly become invalid.

The node initiates log reporting when location accuracy is above a threshold.

The node postpones log reporting when location accuracy is invalid, not available, or is expected to be soon available.

The node postpones log reporting due to high variation in measurement samples, measurement instability, or high measurement uncertainty.

The node postpones reporting measurements for a cell on frequency f1 and/or in RAT 1 due to predicted/expected improvement of measurements on frequency f1 and/or RAT 2, e.g., due to receiver adaptation.

Some examples of actions that may be taken by the node to control logging of data by the logging node are:

When the measurement current quality of logged measurements is below a threshold, the node decides to suspend logging for a certain time or until the measurement quality improves.

The node decides to suspend logging when location data is inaccurate or will shortly become invalid.

FIG. 15 is a flow chart that illustrates a process for controlling reporting and/or logging based on a probability of loss constraint according to one embodiment of the present disclosure. As illustrated, a node (e.g., the logging node or another node) determines a probability of loss (current or predicted) of the logged data logged by a logging node, data associated with the logged data, data to be logged by the logging node, and/or data associated with the data to be logged by the logging node (step 1100). The node then determines whether the probability of loss satisfies one or more probability of loss constraints (step 1102). Criticality of the data that may be lost may also be taken into account, e.g., if the data has been logged for a short time, it may be less critical to ensure that it is reported and vice versa. The node then controls reporting and/or logging by the logging node based on the determination in step 1102 (step 1104). For instance, if the probability of loss is high, the node may control reporting such that the logged data is reported immediately or before the probability of loss exceeds a predefined threshold. Further, if the probability of loss of the data is high, the node may suspend logging for a certain time period or until a certain event or condition (e.g., until a received signal quality or strength become above a threshold indicating that there will be a reporting possibility and the connection attempt failure probability reduces) in order to conserve resources.

The probability of the loss may be based on, e.g.:

A maximum validity duration for the data, an elapsed time since the data was obtained or measured, or the amount of time remaining until expiration of the validity of the data, Availability of replacement data for the data that may be lost or, in other words, the possibility to obtain other data that may replace the data which may be lost (e.g., whether positioning methods are available, i.e., supported by the wireless device 14 and/or the cellular communications network or in an area where the wireless device 14 is currently located or will be located if the available location data expires), Likelihood of changing to another RAT, PLMN, or another area, or a likelihood of any event related to radio network operation which may lead to the loss of logged data, Historical data, e.g., for the same wireless device 14, related to the operation in an area (e.g., the wireless device 14 may predict poor connection quality or another network, etc.), and/or Battery level of the wireless device 14 where the logged data may be lost due to power off.

In some of the embodiments described herein, it may be beneficial for nodes to exchange capability information that is indicative of the capabilities of the nodes related to the enhanced reporting and/or logging techniques described herein. In this regard, FIG. 16 illustrates the operation of a node (Node A) to send its capability information to another node (Node B), which then stores, uses, and/or reports the capability information according to one embodiment of the present disclosure. Note that the exchange of capability information as illustrated in FIG. 16 is not limited to being used with the enhanced reporting and/or logging techniques described herein and may be used for any suitable purpose. Node A may be, for example, one of the wireless devices 14, a radio network node or a network node (e.g., a TCE, a positioning node, a controlling node, etc.). Node B may be any other node such as, for example, a network node (e.g., one of the base stations 12, a positioning node, a relay, a core network node, an MME, a BS Controller (BSC), a Base Transceiver Station (BTS), etc.).

As illustrated, Node A maintains and signals capability information indicative of capabilities of Node A related to enhanced logging and/or reporting under one or more constraints (e.g., quality and/or resource constraint(s)) to Node B (step 1200). The capability information may indicate to the cellular communications network whether Node A is capable of one or more of the following:

Proactively reporting (e.g., prior to the expiry of a timer for reporting results) one or more logged data results under resource constraints, e.g., when one or more resources involved in logging of the measurement data are constraint or limited, e.g., when a limit on memory, battery power, or hardware or processor is reached, Proactively reporting (e.g., prior to the expiry of a timer for reporting results) one or more logged data results under quality constraints, e.g., when the accuracy of the one or more logged measurement data or auxiliary information associated with the data, e.g., time stamp accuracy, positioning accuracy, etc. becomes worse than a threshold, and/or Reporting one or more auxiliary information or parameters associated with the logged data or measurement results, wherein the auxiliary information is one or more of: a radio condition when logging is done, environmental conditions when logging is done, resources used for logging data, or resource utilization for various processes or procedures, which may be online or offline for both types of tasks.

The capability information of Node A may also contain any additional information or parameters described above related to different methods of logging and reporting of the data.

Node A may send the above mentioned capability information to Node B in any of the following manners:

Proactive reporting without receiving any explicit request from Node B (e.g., where Node B is a network node such as a serving base station of Node A or any target base station for a handover for Node A), and/or Reporting upon receiving any explicit request from Node B (e.g., where Node B is a network node such as a serving base station or any target base station for Node A):

The explicit request can be sent to Node A (e.g., one of the wireless devices 14) by the cellular communications network anytime or at any specific occasion. For example, the request for the capability information of Node A can be sent to Node A during initial setup or after a cell change (e.g., handover, RRC connection re-establishment, RRC connection release with redirection, PCell change in CA, change in Primary Component Carrier (PCC), etc.).

In case of proactive reporting, Node A may report its capability information to Node B during one or more of the following occasions:

During initial setup or call setup, e.g., when establishing the RRC connection, and/or During cell change, e.g., handover, primary carrier change in multi-carrier operation, PCell change in multi-carrier operation, RRC re-establishment, RRC connection release with redirection, etc.

Upon receipt of the capability information, Node B stores, uses, and/or reports the capability information of Node A (step 1202). The acquired capability information may be used by Node B for, e.g., performing one or more radio operation tasks or network management tasks. The tasks may include, e.g., forwarding the received capability information to another network node which may use the capability information after Node A switches to a different cell. Node B may also decide and select one or more parameters in a configuration message related to the logging of measurement data based on the capability information for Node A. For example, Node B may request Node A (which in this example is a logging node) to report radio conditions along with measurement data if Node A supports this capability.

FIG. 17 is a block diagram of a network node 18 according to one embodiment of the present disclosure. As illustrated, the network node 18 includes a communication subsystem 20, a radio subsystem 22 that includes one or more radio units (not shown), and a processing subsystem 24. The communication subsystem 20 generally includes analog and, in some embodiments, digital components for sending and receiving communications to and from other network nodes. The radio subsystem 22 generally includes analog and, in some embodiments, digital components for wirelessly sending and receiving messages to and from the wireless devices 14. Note that the radio subsystem 22 is not included in all network nodes. For instance, the radio subsystem 22 is included in network nodes in the RAN, but is not included in network nodes in the core network 16.

The processing subsystem 24 is implemented in hardware or in a combination of hardware and software. In particular embodiments, the processing subsystem 24 may comprise, for example, one or several general-purpose or special-purpose microprocessors or other microcontrollers programmed with suitable software and/or firmware to carry out some or all of the functionality of the network node 18 described herein. In addition or alternatively, the processing subsystem 24 may comprise various digital hardware blocks (e.g., Application Specific Integrated Circuits (ASICs), one or more off-the-shelf digital and analog hardware components, or a combination thereof) configured to carry out some or all of the functionality of the network node 18 described herein. Additionally, in particular embodiments, the above-described functionality of the network node 18 may be implemented, in whole or in part, by the processing subsystem 24 executing software or other instructions stored on a non-transitory computer-readable medium, such as Random Access Memory (RAM), Read Only Memory (ROM), a magnetic storage device, an optical storage device, or any other suitable type of data storage component.

FIG. 18 is a block diagram of one of the wireless devices 14 of FIG. 7 according to one embodiment of the present disclosure. As illustrated, the wireless device 14 includes a radio subsystem 26 that includes one or more radio units (not shown) and a processing subsystem 28. The radio subsystem 26 generally includes analog and, in some embodiments, digital components for wirelessly sending and receiving messages to and from the network nodes in the RAN (e.g., the base stations 12) and, in some embodiment, other wireless devices 14 (e.g., in the case of Device-to-Device (D2D) communication).

The processing subsystem 28 is implemented in hardware or in a combination of hardware and software. In particular embodiments, the processing subsystem 28 may comprise, for example, one or several general-purpose or special-purpose microprocessors or other microcontrollers programmed with suitable software and/or firmware to carry out some or all of the functionality of the wireless device 14 described herein. In addition or alternatively, the processing subsystem 28 may comprise various digital hardware blocks (e.g., one or more ASICs, one or more off-the-shelf digital and analog hardware components, or a combination thereof) configured to carry out some or all of the functionality of the wireless device 14 described herein. Additionally, in particular embodiments, the above-described functionality of the wireless device 14 may be implemented, in whole or in part, by the processing subsystem 28 executing software or other instructions stored on a non-transitory computer-readable medium, such as RAM, ROM, a magnetic storage device, an optical storage device, or any other suitable type of data storage component.

The following acronyms are used throughout this disclosure.

3GPP 3$^{rd}$ Generation Partnership Project
µs Microsecond
ACK Acknowledgement
AICH Acquisition Indicator Channel
ASIC Application Specific Integrated Circuit
BS Base Station
BSC Base Station Controller
BTS Base Transceiver Station
C Celsius
CA Carrier Aggregation
CDMA Code Division Multiple Access
CQI Channel Quality Indicator
CS Circuit Switched
CSG Closed Subscriber Group
D2D Device-to-Device
DCCH Dedicated Control Channel
DL Downlink
EAB Extended Access Barring
Ec Energy per Chip
ECGI Enhanced Universal Terrestrial Radio Access Network Cell Global Identifier
E-CID Enhanced Cell Identifier
E-DCH Enhanced Dedicated Channel
EM Element Manager
eNB Evolved Node B E-RUCCH Enhanced Dedicated Channel Random Access Uplink Control Channel
E-UTRA Evolved Universal Terrestrial Radio Access
E-UTRAN Evolved Universal Terrestrial Radio Access Network
FDD Frequency Division Duplexing
FPACH Fast Physical Access Channel
GERAN Global System for Mobile Communications Edge Radio Access Network
GNSS Global Navigation Satellite System
GSM Global System for Mobile Communications
HeNB Home Evolved Node B
HSPA High Speed Packet Access
Hz Hertz
ID Identifier
IE Information Element
IMEI International Mobile Equipment Identity
IMSI International Mobile Subscriber Identity
IP Internet Protocol
LA Local Area
LTE Long Term Evolution
LMU Location Measurement Unit
M2M Machine-to-Machine
MDT Minimization of Drive Tests
MME Mobility Management Entity
ms Microsecond
MSR Multi-Standard Radio
MTC Machine Type Communication
NB Node B
No Noise Spectral Density
O&M Operation and Management
OSS Operational Support System
OTODA Observed Time Difference of Arrival
PCC Primary Component Carrier
P-CCPCH Primary Common Control Physical Channel
PCell Primary Cell
PCI Physical Cell Identity
PDA Personal Digital Assistant
P-GW Packet Data Network Gateway
PLMN Public Land Mobile Network
Pn Pseudo noise
PSAP Public Safety Answering Point
QoS Quality of Service
RA Registered Area
RACH Random Access Channel
RAM Random Access Memory
RAN Radio Access Network
RAT Radio Access Technology
RBS Radio Base Station
RLF Radio Link Failure
RNC Radio Network Controller
ROM Read Only Memory
RPLMN Registered Public Land Mobile Network
RRC Radio Resource Control
RRH Remote Radio Head
RRU Remote Radio Unit
RSCP Received Signal Code Power
RSRP Reference Signal Received Power
RSRQ Reference Signal Received Quality
RSSI Received Signal Strength Indicator
RSTD Reference Signal Time Difference
RTT Round Trip Time
Rx Receive
Rxlev Received Signal Level
SCell Secondary Cell
S-GW Serving Gateway
s/hr Seconds per Hour
SON Self-Optimized Network
TA Tracking Area
TCE Trace Collection Entity
TDD Time Division Duplexing
TR Technical Report
TS Technical Specification
Tx Transmit
UE User Equipment
UMTS Universal Mobile Telecommunications System
UTRA Universal Terrestrial Radio Access
UTRAN Universal Terrestrial Radio Access Network Those skilled in the art will recognize improvements and modifications to the preferred embodiments of the present disclosure. All such improvements and modifications are considered within the scope of the concepts disclosed herein and the claims that follow.

What is claimed is:

1. A method of operation of a node in a cellular communications network, comprising:
   making a determination as to whether an elapsed time since logged data was last stored by a wireless device in a log is greater than a first threshold but less than a second threshold; and
   attempting to report at least a portion of the log if the elapsed time since the logged data was last stored in the log is one of:
   greater than the first threshold but less than the second threshold, or
   expected to be greater than the first threshold but less than the second threshold,
   thereby improving an ability of the node to provide accurate logged data.

2. The method of claim 1 wherein the logged data is logged measurement data for a Minimization of Drive Test, MDT, log.

3. The method of claim 1 wherein the logged data is logged data for at least one of a radio measurement log, a Radio Resource Control, RRC, connection establishment failure log, a random access failure log, a paging channel failure log, a broadcast channel failure log, and a radio link failure log.

4. The method of claim 1 wherein the logged data comprises at least one of a group consisting of: a plurality of accessibility measurements, a plurality of positioning measurements, a cell identification, one or more radio environment measurements, a transmit power indication, a contention detection indication, data related to failure of specific channels, data related to radio link failure, statistics related to Timing Advance, TA, measurement, statistics related to TA command, statistics related to timing synchronization, timing measurements, and resource usage by the wireless device for performing one or more tasks.

5. The method of claim 1 further comprising sending capability information to another node, the capability information being related to a capability of the node to make the determination and control at least one of reporting of the log and the logging of data in response to the determination.

6. The method of claim 1 wherein the node is the wireless device.

7. The method of claim 1 wherein the node is a network node of the cellular communications network.

8. A wireless device configured to operate in a cellular communications network, comprising:
   a radio subsystem;
   memory; and a processing subsystem associated with the radio subsystem and the memory, the processing subsystem configured to:
  make a determination as to whether an elapsed time since logged data was last stored by the wireless device in a log is greater than a first threshold but less than a second threshold; and
  attempt to report at least a portion of the log if the elapsed time since the logged data was last stored in the log is one of:
    greater than the first threshold but less than the second threshold, or
    expected to be greater than the first threshold but less than the second threshold,
    thereby improving an ability of the wireless device to provide accurate logged data.

* * * * *